(12) United States Patent
Kondo

(10) Patent No.: US 10,623,648 B2
(45) Date of Patent: Apr. 14, 2020

(54) IMAGING APPARATUS, METHOD FOR CONTROLLING THE IMAGING APPARATUS, AND STORAGE MEDIUM

(71) Applicant: CANON KABUSHIKI KAISHA, Tokyo (JP)

(72) Inventor: Emi Kondo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 15/890,720

(22) Filed: Feb. 7, 2018

(65) Prior Publication Data

US 2018/0234630 A1 Aug. 16, 2018

(30) Foreign Application Priority Data

Feb. 14, 2017 (JP) ................................. 2017-025384

(51) Int. Cl.
*G03B 17/14* (2006.01)
*G06F 3/041* (2006.01)
*G06F 3/0481* (2013.01)
*H04N 5/225* (2006.01)
(Continued)

(52) U.S. Cl.
CPC ....... *H04N 5/23293* (2013.01); *G06F 3/0416* (2013.01); *G06F 3/0482* (2013.01); *G06F 3/04817* (2013.01); *H04N 5/23216* (2013.01); *H04N 5/23245* (2013.01); *H04N 5/232933* (2018.08); *G03B 17/14* (2013.01); *G06F 2203/04803* (2013.01); *G06F 2203/04806* (2013.01); *H04N 5/2254* (2013.01)

(58) Field of Classification Search
CPC ... G03B 17/14; G06F 3/0416; G06F 3/04817; H04N 5/2254; H04N 5/23216; H04N 5/23245; H04N 5/23293; H04N 5/232933
See application file for complete search history.

(56) References Cited

U.S. PATENT DOCUMENTS

| 7,136,096 | B1* | 11/2006 | Yamagishi | ......... H04N 5/23293 |
| | | | | 348/218.1 |
| 10,015,404 | B2 | 7/2018 | Hara | |
| 2008/0044169 | A1 | 2/2008 | Wernersson | |

(Continued)

FOREIGN PATENT DOCUMENTS

| JP | 2012-060567 A | 3/2012 |
| JP | 2016-163104 A | 9/2016 |

*Primary Examiner* — Hong Zhou
(74) *Attorney, Agent, or Firm* — Canon USA Inc., IP Division

(57) ABSTRACT

An imaging apparatus capable of restricting the possibility that, in imaging after the orientation of a camera is adjusted, imaging is performed with the camera orientation deviated from the adjusted orientation, includes a display control unit configured to perform control to perform 2-area enlargement display for displaying live view images captured in two different areas horizontally or vertically separated from each other by an imaging unit, side by side on a display unit, and a control unit configured to perform control, in a live view display in a state where the 2-area enlargement display is not performed, not to display a display item for receiving an imaging instruction through a touch operation, and in a case where the 2-area enlargement display is performed, to display the display item for receiving an imaging instruction.

24 Claims, 9 Drawing Sheets

(51) Int. Cl.
  *H04N 5/232*  (2006.01)
  *G06F 3/0482*  (2013.01)

(56) References Cited

U.S. PATENT DOCUMENTS

| | | |
|---|---|---|
| 2008/0192020 A1 | 8/2008 | Kang |
| 2008/0279480 A1* | 11/2008 | Inamoto ................ G06F 3/0481 |
| | | 382/305 |
| 2008/0298791 A1* | 12/2008 | Noda ....................... G03B 7/00 |
| | | 396/55 |
| 2009/0167889 A1* | 7/2009 | Onodera ............ H04N 5/23222 |
| | | 348/222.1 |
| 2010/0066810 A1 | 3/2010 | Ryu |
| 2010/0208107 A1* | 8/2010 | Nonaka ................ G06F 1/1626 |
| | | 348/240.99 |
| 2011/0234640 A1 | 9/2011 | Ishida |
| 2012/0229675 A1 | 9/2012 | Yamamoto |
| 2013/0076649 A1* | 3/2013 | Myers ................. H04M 1/0268 |
| | | 345/173 |
| 2013/0141524 A1 | 6/2013 | Karunamuni |
| 2014/0104377 A1* | 4/2014 | Okamoto ........... H04N 5/23238 |
| | | 348/36 |
| 2014/0160233 A1 | 6/2014 | Ishida |
| 2015/0002698 A1 | 1/2015 | Yu |
| 2015/0355527 A1* | 12/2015 | Takahashi .............. G03B 15/05 |
| | | 348/371 |
| 2017/0054913 A1* | 2/2017 | Hara .................. H04N 5/23293 |
| 2017/0155822 A1* | 6/2017 | Takahashi ............ H04N 5/2259 |
| 2018/0183993 A1 | 6/2018 | Kobayashi |
| 2018/0183996 A1 | 6/2018 | Takahashi |
| 2018/0184006 A1 | 6/2018 | Takagi |
| 2018/0184007 A1 | 6/2018 | Matsushima |
| 2018/0184008 A1 | 6/2018 | Kondo |
| 2018/0234630 A1 | 8/2018 | Kondo |

\* cited by examiner

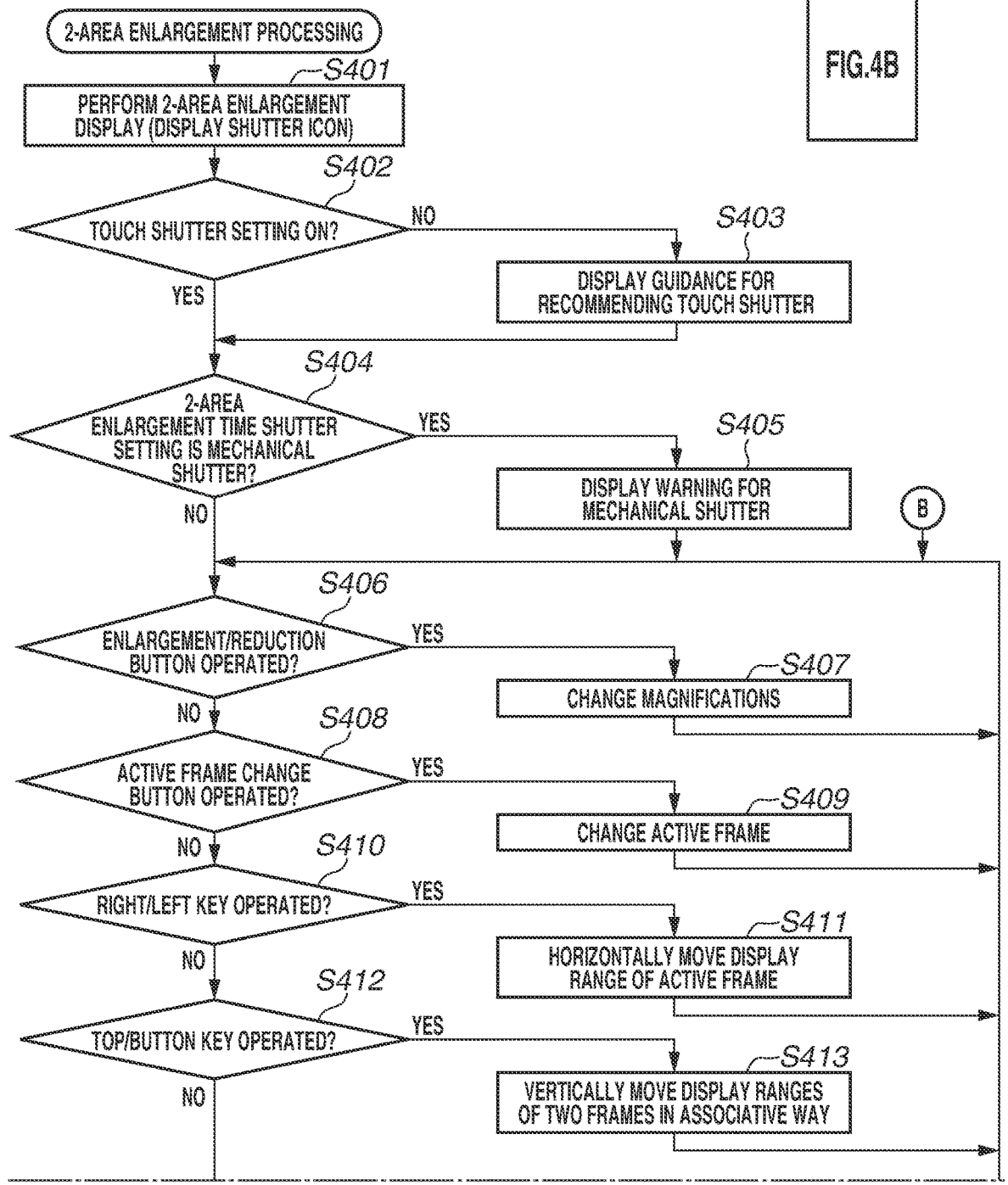

IMAGING APPARATUS, METHOD FOR CONTROLLING THE IMAGING APPARATUS, AND STORAGE MEDIUM

BACKGROUND

Field of the Disclosure

The present disclosure generally relates to imaging and, more particularly, to an imaging apparatus, a method for control the imaging apparatus, a storage medium, and a technique for enlarging display of a part of a live view image.

Description of the Related Art

When using a camera, it is desirable to image a subject while horizontally holding the camera in some cases. For example, if the camera is not horizontally held when imaging a subject such as a building or scenery, a captured image is inclined and an awkward result may be obtained. To solve the issue, Japanese Patent Application Laid-Open No. 2012-060567 discusses a technique for detecting the orientation of a camera based on the direction of gravity detected by an acceleration sensor, and displaying the level display indicating the detected camera orientation together with a live view. Japanese Patent Application Laid-Open No. 2016-163104 discusses a technique for displaying, side by side, enlarged images of two different areas horizontally separated from each other on the live view image, making it possible to visually perform horizontal adjustment with good accuracy.

Even if a user strictly adjusts the orientation of the camera by using the techniques discussed in Japanese Patent Application Laid-Open No. 2012-060567 and Japanese Patent Application Laid-Open No. 2016-163104, a camera shake or vibration may occur at the time of imaging. In this case, the orientation adjusted before imaging is not necessarily maintained. For example, when the user presses the shutter button, the camera shakes or a vibration occurs by traveling shutter blades, and imaging may possibly be performed with the camera orientation deviated from the adjusted orientation.

SUMMARY

The present disclosure generally relates to an imaging apparatus capable of restricting the possibility that, in imaging after the orientation of a camera is adjusted, imaging is performed with the camera orientation deviated from the adjusted orientation. The present disclosure also relates to a method for controlling the imaging apparatus, and a recording medium.

According to one or more aspects of the present disclosure, an imaging apparatus includes a display control unit configured to perform control to perform 2-area enlargement display for displaying live view images captured in two different areas horizontally or vertically separated from each other by an imaging unit, side by side on a display unit, and a control unit configured to perform control, in a live view display in a state where the 2-area enlargement display is not performed, not to display a display item for receiving an imaging instruction through a touch operation, and in a case where the 2-area enlargement display is performed, to display the display item for receiving an imaging instruction.

Further features of the present disclosure will become apparent from the following description of exemplary embodiments with reference to the attached drawings.

BRIEF DESCRIPTION OF THE DRAWINGS

FIGS. 4A and 4B, collectively FIG. 4, is a flowchart illustrating 2-area enlargement processing.

DESCRIPTION OF THE EMBODIMENTS

Various exemplary embodiments, features, and aspects of the present disclosure will be described in detail below with reference to the accompanying drawings. It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1A:
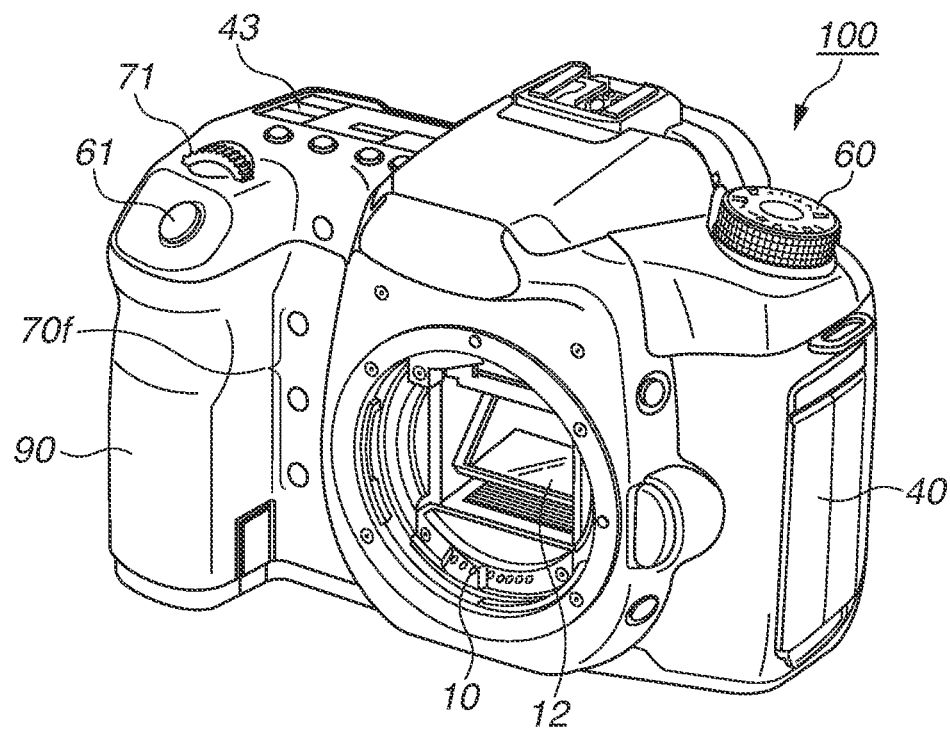
FIGS. 1A and 1B illustrate an outer appearance of a digital camera.
Figure 1B:
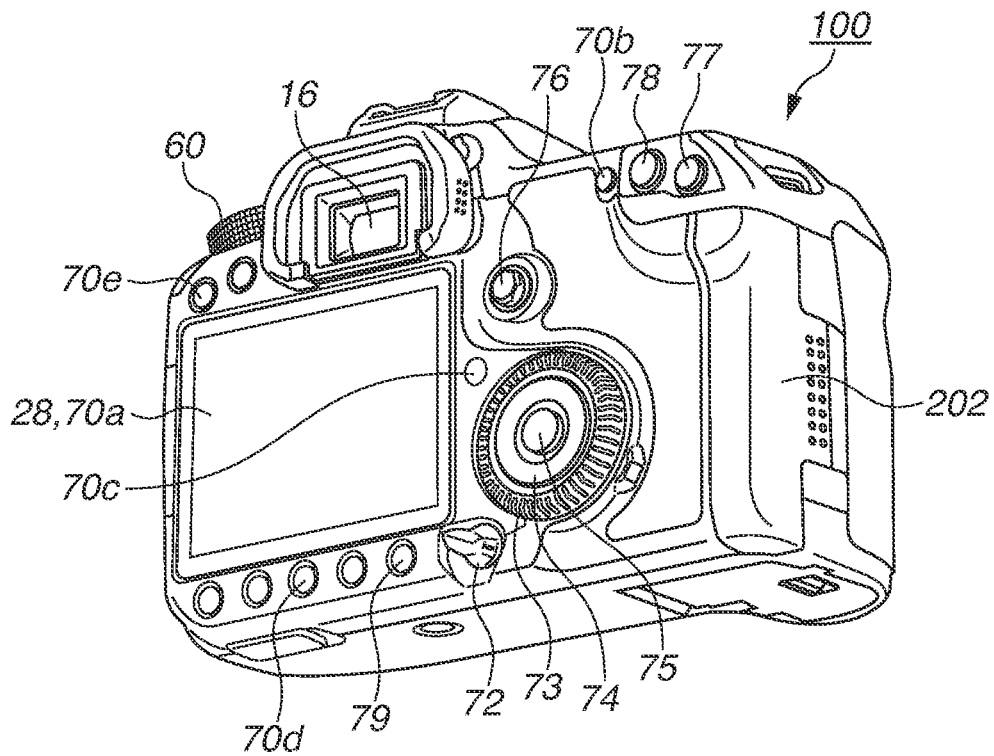

FIGS. 1A and 1B illustrate an outer appearance of a digital camera 100 as an example of an apparatus according to the present disclosure. FIG. 1A is a perspective view illustrating the front panel of the digital camera 100, and FIG. 1B is a perspective view illustrating the rear panel of the digital camera 100. Referring to FIGS. 1A and 1B, a display unit 28 disposed on the rear panel displays an image and various information. An out-finder display unit 43, a display unit disposed on the top face, displays the shutter speed, diaphragm, and other various setting values of the camera 100. A shutter button 61 is an operation portion for issuing an imaging instruction. A mode selection switch 60 is an operation portion for switching between various modes. A terminal cover 40 is a cover for protecting connectors (not illustrated) such as a connection cable for connecting an external apparatus and the digital camera 100. A main electronic dial 71 is a rotary operation member included in an operation unit 70. Turning the main electronic dial 71 enables changing setting values such as the shutter speed and diaphragm. A power switch 72 is an operation member for turning power of the digital camera 100 ON and OFF. A sub electronic dial 73, a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75 included in the operation unit 70 is mainly used to determine a selection item. A live view (LV) button 76 included in the operation unit 70 turns the live view (LV) ON and OFF in the still image imaging mode. In the moving image capturing mode, the LV button 76 is used to instruct the camera 100 to start and stop moving image capturing (recording). An enlargement button 77, an operation button included in the operation unit 70, turns the enlargement mode ON and OFF in live view display in the imaging mode and changes the magnification in the enlargement mode. In the playback image, the enlargement button 77 enlarges the playback image and increases the magnification. A reduction button 78 included in the operation unit 70 reduces the magnification of the enlarged playback image to reduce the displayed image. A playback button 79 included in the operation unit 70 switches between the imaging mode and the playback mode. When a user presses the playback button 79 in the imaging mode, the camera 100 enters the playback mode, and the latest image of images recorded in a recording medium 200 is displayed on the display unit 28. A quick return mirror 12 is moved up and down by an actuator (not illustrated) under the direction of a system control unit 50. A communication terminal 10 is used by the digital camera 100 to communicate with the detachably attached lens. An eyepiece finder 16 is a look-in type finder for confirming the focus and composition of an optical image of a subject obtained through a lens unit 150 by observing a focusing screen 13. A cover 202 is a cover of a slot storing the recording medium 200. A grip portion 90 is a holding portion having a shape which is easy to grasp with the right hand, when the user holds the digital camera 100.

Figure 2:
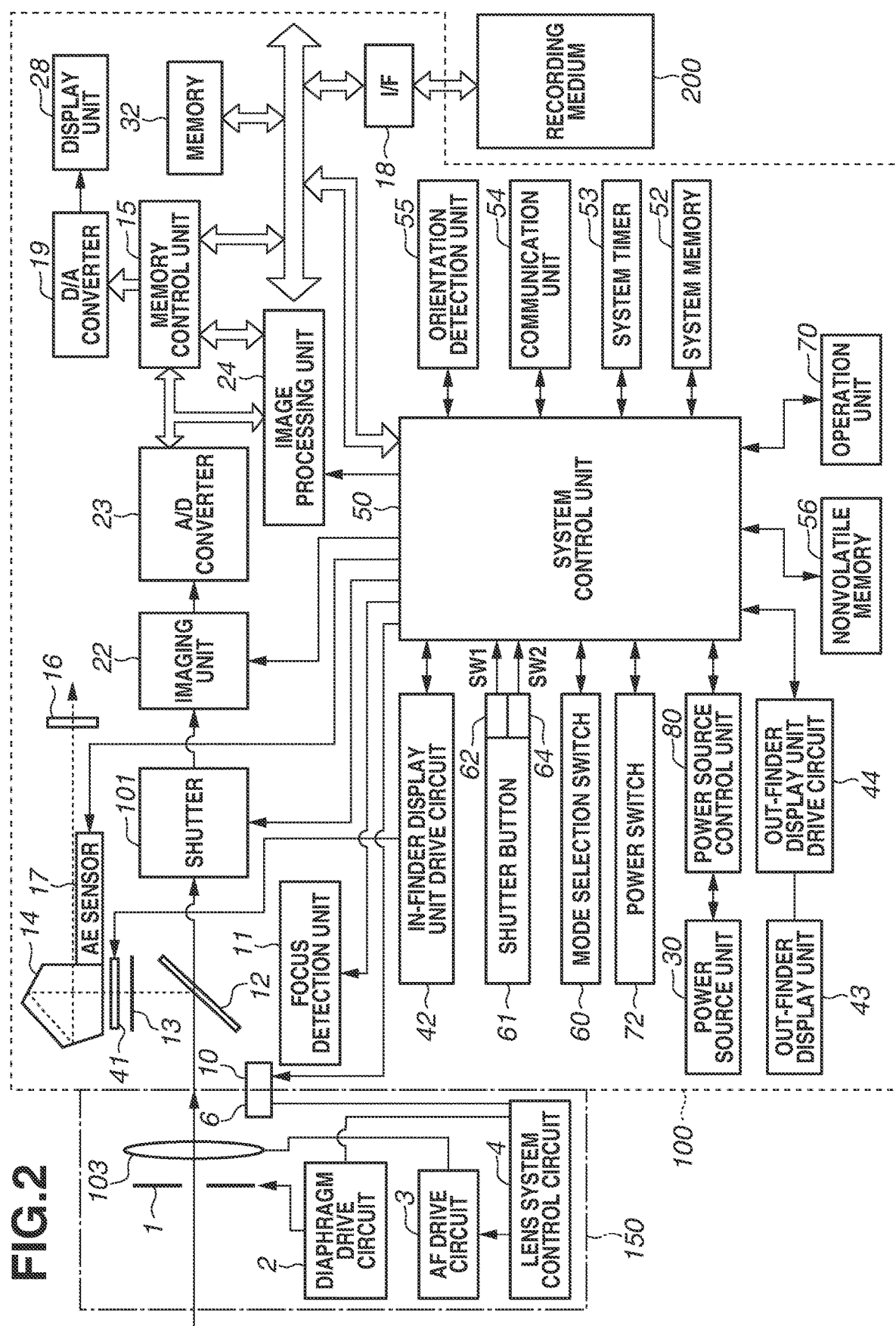
FIG. 2 is a block diagram illustrating a configuration of the digital camera.

FIG. 2 is a block diagram illustrating an example of a configuration of the digital camera 100 according to the present exemplary embodiment.

Referring to FIG. 2, the lens unit 150 mounts an exchangeable imaging lens.

Although the lens 103 includes a plurality of lenses, FIG. 2 illustrates only one lens for simplification. A communication terminal 6 is used by the lens unit 150 to communicate with the digital camera 100. The communication terminal 10 is used by the digital camera 100 to communicate with the lens unit 150. The lens unit 150 communicates with the system control unit 50 via the communication terminals 6 and 10. In the lens unit 150, a lens system control circuit 4 controls a diaphragm 1 via a diaphragm drive circuit 2 and changes the position of the lens 103 via an AF drive circuit 3 to focus on the subject.

An auto exposure (AE) sensor 17 measures the luminance of the subject through the lens unit 150.

A focus detection unit 11 outputs defocus amount information to the system control unit 50. The system control unit 50 controls the lens unit 150 based on the information to perform phase difference autofocus (AF).

When performing exposure, live view imaging, and moving image capturing, the quick return mirror 12 (hereinafter referred to as a mirror 12) is moved up and down by the actuator (not illustrated) under the direction of the system control unit 50. The mirror 12 switches the destination of the incident light flux from the lens 103 between the finder 16 and an imaging unit 22. In the normal state, the mirror 12 is usually disposed to reflect the light flux to guide it to the finder 16. In the imaging and live view display states, the mirror 12 pops up to guide the light flux to the imaging unit 22 and retreats from the light flux (mirror up). The center portion of the mirror 12 is configured as a half mirror to transmit a part of light so that a part of the light flux is incident to the focus detection unit 11 for performing focus detection.

A photographer can confirm the focus and composition of an optical image of a subject obtained through the lens unit 150 by observing the focusing screen 13 via a pentaprism 14 and the finder 16.

A shutter 101 is a focal plane shutter capable of freely controlling the exposure time of the imaging unit 22 under the control of the system control unit 50. The shutter 101 has a leading blade and a trailing blade and physically shields the imaging unit 22.

The imaging unit 22 is an image sensor (imaging sensor) including a charge coupled device (CCD) sensor or a complementary metal oxide semiconductor (CMOS) sensor for converting an optical image into an electric signal. An analog-to-digital (A/D) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the A/D converter 23 or data from a memory control unit 15. The image processing unit 24 performs predetermined calculation processing by using captured image data. The system control unit 50 performs exposure control and ranging control based on an obtained calculation result. This enables performing the AF processing, AE processing, and pre-flash (EF) processing based on the Through the Lens (TTL) method. The image processing unit 24 further performs predetermined calculation processing by using captured image data, and performs TTL-based automatic white balance (AWB) processing based on the obtained calculation result.

The output data from the A/D converter 23 is written in the memory 32 via the image processing unit 24 and the memory control unit 15, or directly written in the memory 32 via the memory control unit 15. The memory 32 stores image data captured by the imaging unit 22 and converted into digital data by the A/D converter 23, and stores image data to be displayed on the display unit 28. The memory 32 is provided with a sufficient storage capacity for storing a predetermined number of still images and moving images and sound for a predetermined time.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed on the display unit 28 via the D/A converter 19. The display unit 28 displays an image corresponding to the analog signal from the D/A converter 19 on a display such as a liquid crystal display (LCD). The digital signal generated through A/D conversion by the A/D converter 23 and stored in the memory 32 is converted into an analog signal by the D/A converter 19 and successively transmitted to the display unit 28. The display unit 28 displays an image based on the analog signal, functioning as an electronic view finder capable of live view display.

A frame (AF frame) indicating the focusing point at which autofocus is currently being performed and icons indicating the setting conditions of the camera 100 are displayed on an in-finder LCD unit 41 via an in-finder display unit drive circuit 42.

The shutter speed, diaphragm, and other various setting values of the camera 100 are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operations of the system control unit 50 are stored in the nonvolatile memory 56. Programs stored in the nonvolatile memory 56 refer to programs for executing various flowcharts (described below) according to the present exemplary embodiment.

The system control unit 50 may have one or more processors and one or more memories, and may control the entire digital camera 100. Each piece of processing according to the present exemplary embodiments (described below) is implemented when the system control unit 50 executes the above-described programs recorded in the nonvolatile memory 56. A system memory 52 is a random access memory (RAM). The constants and variables for operations of the system control unit 50 and the programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various control and time of a built-in clock.

The mode selection switch 60, a first shutter switch 62, a second shutter switch 64, and the operation unit 70 are operation portions for inputting various operation instructions to the system control unit 50.

The mode selection switch 60 switches the operation mode of the system control unit 50 between the still image recording mode, the moving image capturing mode, and the playback mode. Modes included in the still image recording mode include the auto imaging mode, auto scene determination mode, manual mode, diaphragm priority mode (Av mode), and shutter speed priority mode (Tv mode). The digital camera 100 is provided with various scene modes as imaging settings for each imaging scene, the programmed AE mode, and the custom mode. The mode selection switch 60 allows the user to directly select one of these modes. Alternatively, after selecting the imaging mode list screen by using the mode selection switch 60, the user may select either one of a plurality of displayed modes by using other operation member. Likewise, a plurality of modes may also be included in the moving image capturing mode.

The first shutter switch 62 turns ON in the middle of an operation (half-depression) of the imaging operation member provided on the digital camera 100, i.e., the shutter button 61, to generate a first shutter switch signal SW1. The half-depression refers to a first operation, i.e., an imaging preparation instruction. The first shutter switch signal SW1 causes the system control unit 50 to start operations for imaging preparation processing including the AF processing, AE processing, AWB processing, and EF processing.

A second shutter switch 64 turns ON upon completion of an operation (full-depression) of the shutter button 61 to generate a second shutter switch signal SW2. The full-depression refers to a second operation, i.e., an imaging instruction operation. The second shutter switch signal SW2 causes the system control unit 50 to start a series of operations in the imaging processing from signal reading from the imaging unit 22 to image data writing in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image advancing button, jump button, narrowing-down button, and attribute change button. For example, when a menu button 70e is pressed, the menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as an input unit for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a four-way button of which the upper, lower, right, and left portions can be pressed in. Although, in the present exemplary embodiment, the cross key 74 is described as an integrally formed operation portion, the cross key 74 may be provided as four independent buttons (upper, lower, right, and left buttons). Hereinafter, the top and button keys are collectively referred to as a top/bottom key, and the right and left keys are collectively referred to as a right/left key. The operation unit 70 also includes the following operation portions.

An AF-ON button 70b is a push-in button switch included in the operation unit 70. Pressing this button issues an instruction for executing AF. The depressing direction of the AF-ON button 70b is parallel to the direction (optical axis) of subject light incident to the imaging unit 22 from the lens 103.

A quick setting key 70c (hereinafter referred to as a Q button 70c) is a push-in button switch included in the operation unit 70. Pressing this key displays a quick setting menu as a list of setting items settable in each operation mode. For example, the Q button 70c is pressed during the imaging standby state in live view imaging, a list of setting items including the electronic leading blade shutter, monitor brightness, LV screen WB, 2-area enlargement, and silent imaging is superimposed on the LV in one row. When the user selects a desired option in the displayed quick setting menu by using the top/bottom key and then press a SET button, the user can shift to the setting change and operation mode related to the selected setting item.

An active frame change button 70d is a push-in button switch included in the operation unit 70. Pressing this button in the 2-area enlargement processing (described below) selects the active enlarged position (frame) out of the two enlarged positions. This button is assigned different functions depending on the operation modes. Pressing this button in the playback mode gives a protection attribute to the displayed image.

The menu button 70e is a push-in button switch included in the operation unit 70. Pressing this button displays on the display unit 28 the menu screen in which various settings are possible.

Function buttons 70f are three push-in button switches included in the operation unit 70. The function buttons 70f are assigned different functions. The function buttons 70f are disposed at positions which can be operated with the middle finger, third finger, and little finger of the right hand holding the grip portion 90. The depressing direction is parallel to the direction (optical axis) of the subject light incident to the imaging unit 22 from the lens 103.

A power source control unit 80 includes a battery detection circuit, a direct-current to direct-current (DC-DC) converter, and a switch circuit for selecting a block to be supplied with power. The power source control unit 80 detects the presence or absence of a battery, the battery type, and the remaining battery capacity. The power source control unit 80 also controls the DC-DC converter based on the result of the detection and an instruction of the system control unit 50 to supply various voltages to the recording medium 200 and other components for various time periods.

A power source unit 30 includes a primary battery (such as an alkaline battery and a lithium battery), a secondary battery (such as a NiCd battery, NiMH battery, and Li battery), and an alternating current (AC) adaptor. A recording medium interface (I/F) 18 is an interface to the recording medium 200 such as a memory card and hard disk. The recording medium 200 is such a recording medium as a memory card for recording captured images, including a semiconductor memory and magnetic disk.

A communication unit 54 wirelessly or wired establishes connection to perform transmission and reception of an image signal and an audio signal. The communication unit 54 can also connect with a wireless Local Area Network (LAN) and the Internet. The communication unit 54 can transmit images (including a live view image) captured by the imaging unit 22 and images recorded in the recording medium 200, and receive image data and other various information from an external apparatus.

An orientation detection unit 55 detects the orientation of the digital camera 100 in the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or a gyroscope sensor can be used as the orientation detection unit 55.

The units described throughout the present disclosure are exemplary and/or preferable modules for implementing processes described in the present disclosure. The modules can be hardware units (such as circuitry, firmware, a field programmable gate array, a digital signal processor, an application specific integrated circuit, a component, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

As one component of the operation unit 70, the digital camera 100 is provided with the touch panel 70a that is capable of detecting a contact on the display unit 28. The touch panel 70a and the display unit 28 can be integrally formed. For example, the touch panel 70a is configured so that the transmittance of light does not disturb the display of the display unit 28, and is attached to the upper layer of the display surface of the display unit 28. Then, the input coordinates on the touch panel 79a are associated with the display coordinates on the display unit 28. This enables configuring such a graphical user interface (GUI) that allows the user to have a feeling of directly operating the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen from the touch panel 70a to end touching (hereinafter referred to as a "touch-up")

A state where the finger or pen is not in contact with the touch panel 70a (hereinafter referred to as a "touch-off")

When a touch-down is detected, a touch-on is detected at the same time. After a touch-down is detected, a touch-on is normally kept being detected until a touch-up is detected. A touch-move is also detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

The above-described operations and states as well as the position coordinates of the position where the finger or pen contacts the touch panel 70a are notified to the system control unit 50 via an internal bus. Based on the notified information, the system control unit 50 determines what kind of a touch operation has been performed on the touch panel 70a. As for a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation has been performed. An operation to quickly move the finger over a certain distance while in contact with the touch panel 70a and then release the finger is referred to as a flick. In other words, a flick is an operation by the finger quickly touching and moving, like a quick swiping motion, on the surface of the touch panel 70a. When a touch-move at a predetermined speed or higher over a predetermined distance or longer is detected and then a touch-up is subsequently detected, it can be determined that a flick has been performed (a flick has been performed following a slide operation). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of various types including resistance film type, capacitance type, surface acoustic wave type, infrared-ray type, electromagnetic induction type, image recognition type, and optical sensor type. Although a touch is detected when the finger or pen comes in contact with the touch panel 70a or when the finger or pen comes close to the touch panel 70a depending on the type, either type is applicable.

Figure 3A:
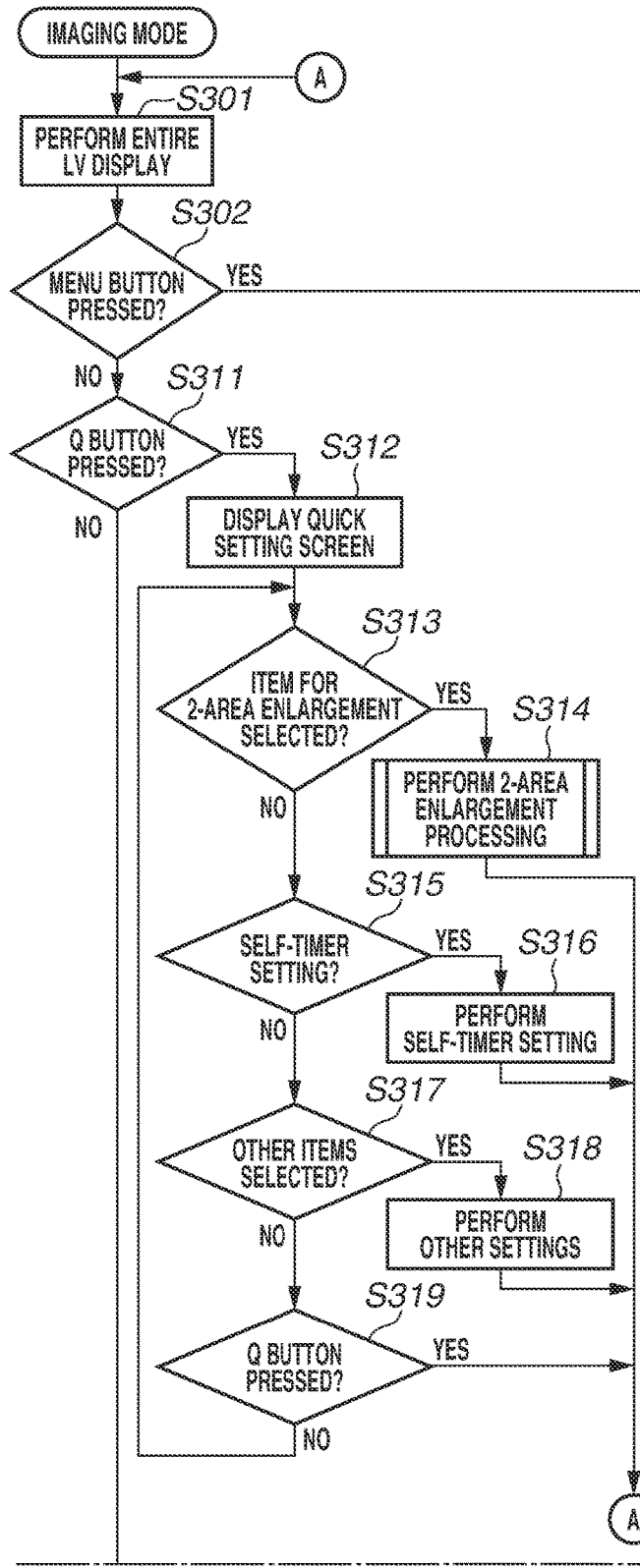
FIGS. 3A and 3B, collectively
Figure 3:
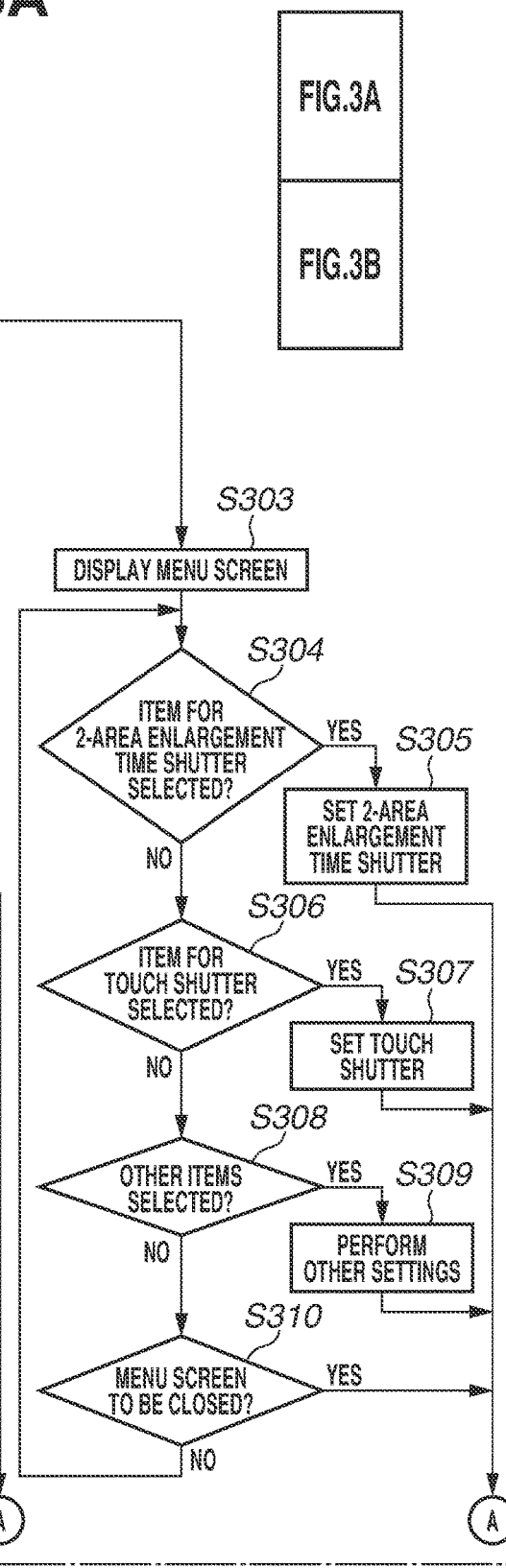
FIG. 3, is a flowchart illustrating imaging mode processing.
Figure 3B:
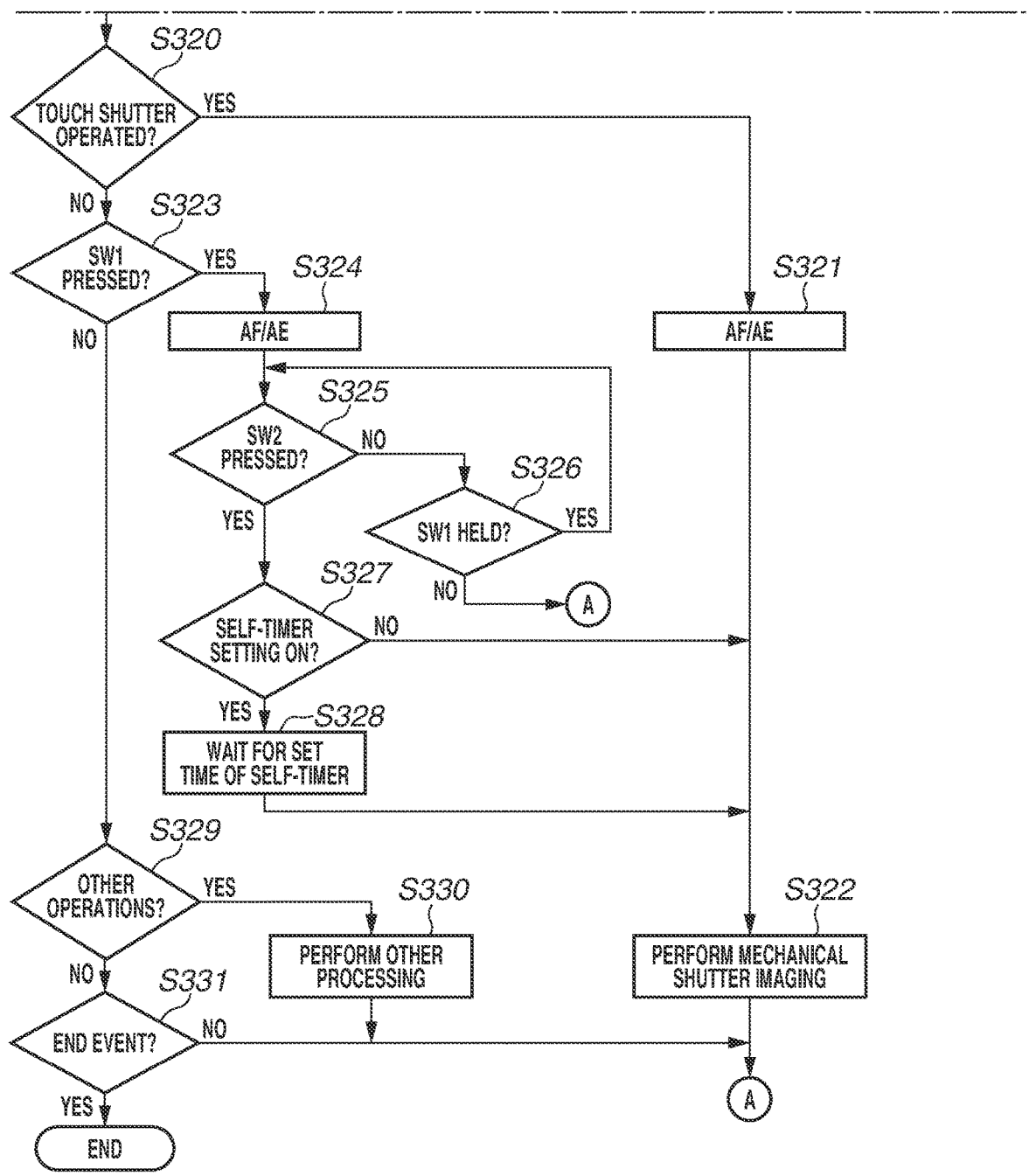

FIGS. 3A and 3B (hereinafter collectively referred to as FIG. 3) is a flowchart illustrating processing in the LV imaging mode of the digital camera 100. This processing is implemented when the system control unit 50 loads a program recorded in the nonvolatile memory 56 into the system memory 52 and then executes the program. When the digital camera 100 is activated in the imaging mode and then the live view imaging is turned ON, the digital camera 100 starts the processing illustrated in FIG. 3.

Figure 5A:
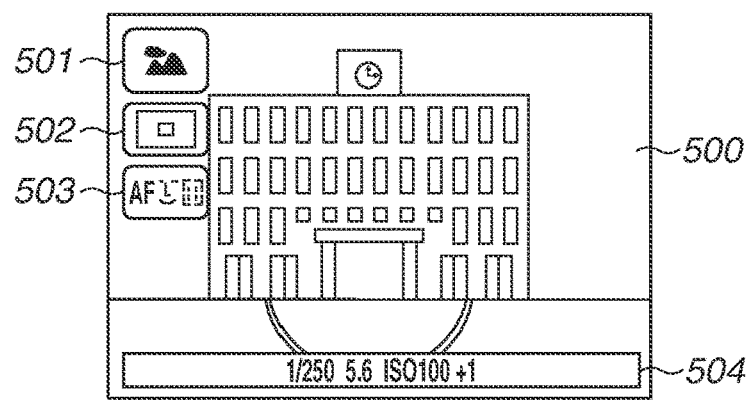
FIGS. 5A to 5D illustrate display examples in the imaging mode processing.

In step S301, the system control unit 50 displays an imaging standby screen on the display unit 28. FIG. 5A illustrates a display example of the imaging standby screen. The imaging standby screen displays a live view image 500

(LV image 500) which indicates the entire imaging range. The LV image 500 is an entire live view image in which the entire imaging range (a range reflected to a captured image to be recorded as an image file) is reflected. An imaging mode icon 501, a drive mode icon 502, and an AF system icon 503 are displayed on the LV image 500 in a superimposed way. The imaging mode icon 501 indicates the current imaging mode setting out of a plurality of imaging modes. The drive mode icon 502 indicates the current drive setting out of single imaging, continuous imaging, and self-timer imaging. The AF system icon 503 indicates the current AF system setting out of face+tracking priority AF, live 1-point AF, live zone AF, and other AF system settings. The imaging mode icon 501, the drive mode icon 502, and the AF system icon 503 are all imaging information which indicates the current setting values of imaging-related settings (imaging settings).

In step S302, the system control unit 50 determines whether the menu button 70e is pressed. When the menu button 70e is pressed (YES in step S302), the processing proceeds to step S303. On the other hand, when the menu button 70e is not pressed (NO in step S302), the processing proceeds to step S311.

Figure 5B:
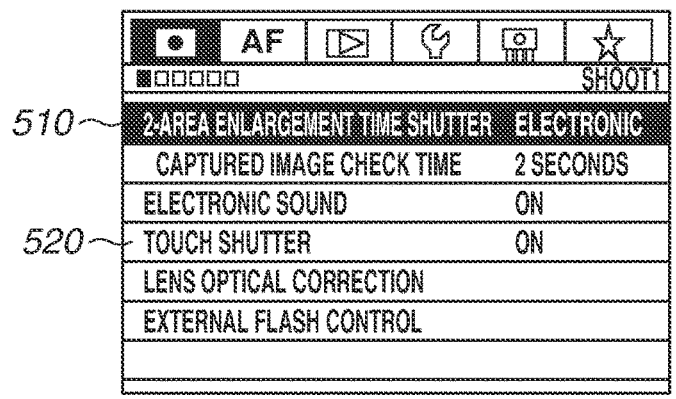

In step S303, the system control unit 50 displays the menu screen on the display unit 28. The menu screen allows the user to make various settings including imaging parameter settings, time settings, and language settings. FIG. 5B illustrates a display example of the menu screen. The menu screen displays a plurality of menu items including a menu item 510 related to a time shutter setting during the 2-area enlargement (2-area enlargement time shutter setting) and a menu item 520 related to a touch shutter setting. The user can select an arbitrary menu item and make setting for the selected menu item.

In step S304, the system control unit 50 determines whether the menu item 510 related to the 2-area enlargement time shutter setting is selected from a plurality of menu items displayed on the menu screen and then the determination operation (depression of the SET button 75) is performed. When the menu item 510 related to the 2-area enlargement time shutter setting is selected and determined (YES in step S304), the processing proceeds to step S305. On the other hand, when the menu item 510 is not selected (NO in step S304), the processing proceeds to step S306.

Figure 5C:
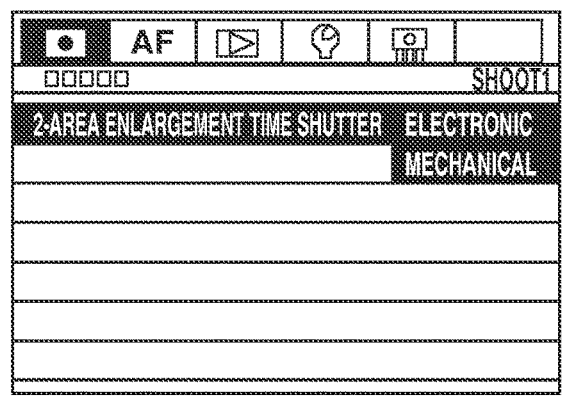

In step S305, the system control unit 50 displays a 2-area enlargement time shutter setting screen to receive setting operations from the user. FIG. 5C illustrates a display example of the 2-area enlargement time shutter setting screen. The 2-area enlargement time shutter setting is the setting of the shutter system for imaging when the 2-area enlargement display (described below) is being performed: electronic shutter or mechanical shutter. This setting includes the electronic shutter ("Electronic") and mechanical shutter ("Mechanical") options. The electronic shutter system performs imaging not by driving the shutter 101 but by electrically turning the image sensor (imaging unit 22) ON and OFF. The electronic shutter does not accompany the travel of blades of the shutter 101 and therefore produces little vibration and is unlikely to generate a camera shake. On the other hand, the mechanical shutter (mechanical shutter system) performs imaging by traveling shutter blades composed of a leading blade and a trailing blade included in the shutter 101. The mechanical shutter accompanies the travel (drive) of the blades of the shutter 101, producing a vibration, and therefore is more likely to generate a camera shake than the electronic shutter. On the other hand, in a state where a rolling distortion occurs, using the mechanical shutter is more effective than using the electronic shutter. The 2-area enlargement display (described below) is used to strictly adjust the orientation of the camera 100 before imaging. When the above-described 2-area enlargement display is used, it is not desirable that the orientation strictly adjusted is deviated by a vibration by the mechanical shutter. Therefore, when priority is given to strictly adjusting the orientation when imaging through the 2-area enlargement display, it is preferable to set the electronic shutter as the 2-area enlargement time shutter setting. When the user selects either the electronic shutter option or the mechanical shutter option and performs the determination operation, the system control unit 50 sets the selected option as the 2-area enlargement time shutter setting and records the setting value in the nonvolatile memory 56. Then, the system control unit 50 closes the menu screen, and the processing returns to step S301.

In step S306, the system control unit 50 determines whether the menu item 520 related to the touch shutter setting is selected from a plurality of menu items displayed on the menu screen and then the determination operation (depression of the SET button 75) is performed. When the menu item 520 related to the touch shutter setting is selected and determined (YES in step S306), the processing proceeds to step S307. On the other hand, when the menu item 520 is not selected (NO in step S306), the processing proceeds to step S308. In step S307, the system control unit 50 sets the touch shutter to "ON" or "OFF" in response to a user operation and records the setting value in the nonvolatile memory 56. When the touch shutter is set to "ON", the system control unit 50 performs imaging in response to a touch-down on the live view displayed on the display unit 28 or a touch-up from the live view. When the touch shutter is set to "OFF", the system control unit 50 does not perform imaging even if a touch operation is performed on the live view.

In step S308, the system control unit 50 determines whether another menu item is selected from a plurality of menu items displayed on the menu screen. When another menu item is selected and determined (YES in step S308), the processing proceeds to step S309. In step S309, the system control unit 50 performs setting according to the selected menu item. On the other hand, when another menu item is not selected (NO in step S308), the processing proceeds to step S310.

In step S310, the system control unit 50 determines whether an operation for closing the menu screen (an operation for exiting the menu) is performed. For example, the operation for closing the menu screen refers to the depression of the menu button 70e while the top menu is displayed or the shutter button 61 is half-pressed. When the operation for closing the menu screen is performed (YES in step S310), the system control unit 50 hides the menu screen, and the processing returns to step S301. On the other hand, when the operation is not performed (NO in step S310), the processing proceeds to step S304.

Figure 5D:
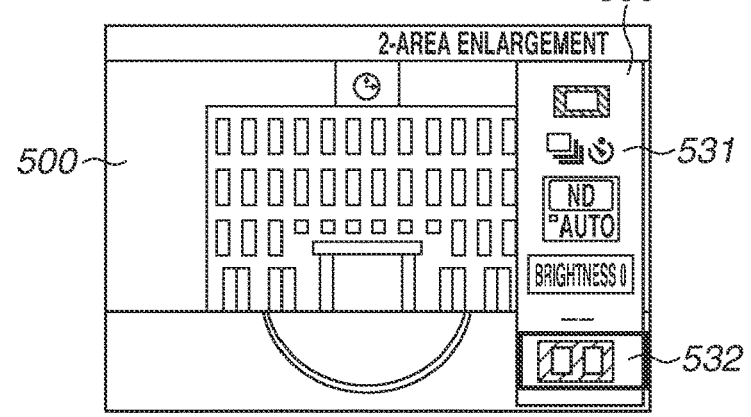

In step S311, the system control unit 50 determines whether the Q button 70c is pressed. When the Q button 70c is pressed (YES in step S311), the processing proceeds to step S312. On the other hand, when the Q button 70c is not pressed (NO in step S311), the processing proceeds to step S320. In step S312, the system control unit 50 displays a quick setting menu on the display unit 28. FIG. 5D illustrates a display example of the quick setting menu. A quick setting menu 530 is superimposed on the live view image 500. The quick setting menu 530 displays a group of icons indicating different items. A cursor is displayed on a selected icon. The cursor can be moved by performing a vertical movement operation with the cross key 74.

Figure 4B:
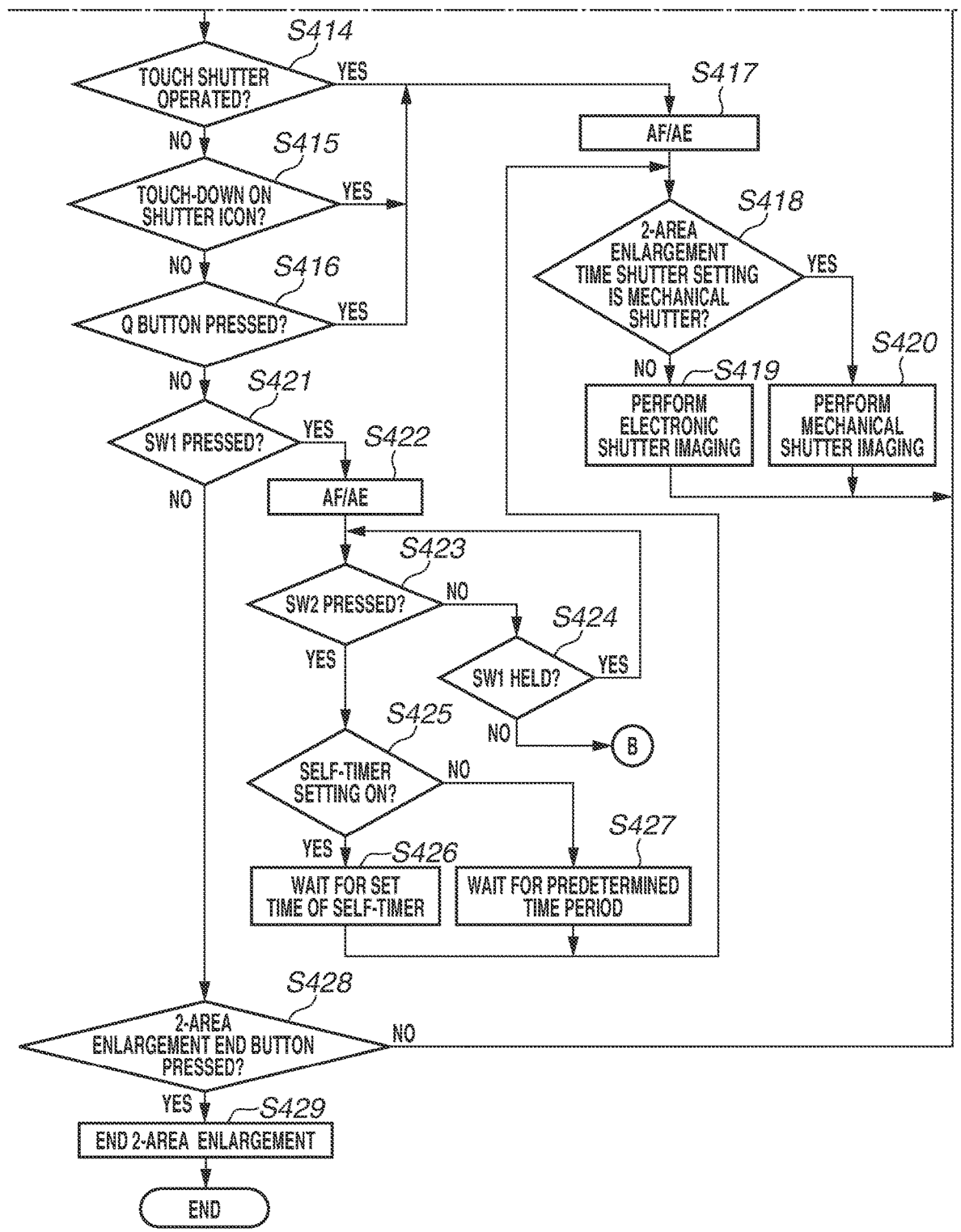

In step S313, the system control unit 50 determines whether the SET button 75 is pressed with the cursor positioned at a 2-area enlargement item 532 (in a state illustrated in FIG. 5D) out of a plurality of items displayed on the quick setting menu 530. More specifically, the system control unit 50 determines whether the 2-area enlargement item 532 is selected and the determination operation is performed. When the system control unit 50 determines that the 2-area enlargement item is selected and determined (YES in step S313), the processing proceeds to step S314. On the other hand, when the 2-area enlargement item is not selected (NO in step S313), the processing proceeds to step S315. In step S314, the system control unit 50 performs the 2-area enlargement processing. The 2-area enlargement processing will be described below with reference to FIGS. 4A and 4B (hereinafter collectively referred to as FIG. 4).

In step S315, the system control unit 50 determines whether the SET button 75 is pressed with the cursor positioned at a self-timer setting item 531 out of the plurality of items displayed on the quick setting menu 530. More specifically, the system control unit 50 determines whether the self-timer setting item (a drive mode setting item) is selected and determined. When the system control unit 50 determines that the self-timer setting item is selected and determined (YES in step S315), the processing proceeds to step S316. On the other hand, when the self-timer setting item is not selected (NO in step S315), the processing proceeds to step S317. In step S316, the system control unit 50 receives a setting operation related to the self-timer from the user and records the set setting value in the nonvolatile memory 56. The self-timer setting is performed as one of drive mode settings. As drive mode settings, the user can select and set any one of single imaging (single shot), continuous imaging, a 2-second self-timer, a 10-second self-timer, and a self-timer with the number of seconds that user arbitrarily sets.

In step S319, the system control unit 50 determines whether the Q button 70c is pressed. When the Q button 70c is pressed (YES in step S319), the system control unit 50 ends the display of the quick setting menu. On the other hand, when the Q button 70c is not pressed (NO in step S319), the processing returns to step S313. In step S313, the system control unit 50 repeats the above-described processing.

In step S320, the system control unit 50 determines whether a touch shutter operation is performed. The processing in step S320 is performed only when the above-described touch shutter setting is "ON" and is not performed when the touch shutter setting is "OFF". When the system control unit 50 determines that a touch shutter operation is performed (YES in step S320), the processing proceeds to step S321. On the other hand, when the touch shutter operation is not pressed (NO in step S320), the processing proceeds to step S323. The touch shutter operation refers to a touch-down on an effective area when the LV image 500 is displayed on the display unit 28. The effective area refers to an area where display elements other than the LV image 500, such as the imaging mode icon 501, the drive mode icon 502, and the AF system icon 503, are not superimposed. Although, in the present exemplary embodiment, the system control unit 50 considers a touch-down as a touch shutter operation, the system control unit 50 may determine that a touch shutter operation is performed when a touch-up is performed in the effective area.

In step S321, the system control unit 50 performs imaging preparation processing such as AF and AE focusing on the subject at a position touched in the touch shutter operation. Upon completion of the imaging preparation processing, the processing proceeds to step S322. In step S322, the system control unit 50 performs imaging with the mechanical shutter. More specifically, the system control unit 50 performs a series of imaging processing including performing exposure by driving the shutter 101, and recording a captured image in the recording medium 200 as an image file.

In step S323, the system control unit 50 determines whether the shutter button 61 is half-pressed and SW1 is set to ON. When SW1 is set to ON (YES in step S323), the processing proceeds to step S324. On the other hand, when SW1 is not set to ON (NO in step S323), the processing proceeds to step S329.

In step S324, the system control unit 50 performs AF with the set AF system (any one of 1-point AF, face AF, and Artificial Intelligence Auto Focus (AiAF)). In addition to AF, the system control unit 50 further performs imaging preparation processing such as automatic exposure (AE).

In step S325, the system control unit 50 determines whether the shutter button 61 is fully pressed and SW2 is set to ON. When SW2 is set to ON (YES in step S325), the processing proceeds to step S327. On the other hand, when the SW2 is not set to ON (NO in step S325), the processing proceeds to step S326. In step S326, the system control unit 50 determines whether the half-pressed state of the shutter button 61 (ON state of SW1) is maintained. When the ON state of SW1 is maintained (YES in step S326), the processing returns to step S325. On the other hand, when the ON state of SW1 is not maintained, i.e., the half-pressed state of the shutter button 61 is canceled (NO in step S326), the processing returns to step S301.

In step S327, the system control unit 50 determines whether the self-timer setting is ON. When any one of the 2-second self-timer, the 10-second self-timer, and the self-timer set with the arbitrary number of seconds by the user (i.e., when self-timer imaging is set), the system control unit 50 determines that the self-timer setting is ON (YES in step S327), and the processing proceeds to step S328. On the other hand, when the self-timer setting is not ON (single imaging or continuous imaging is set) (NO in step S327), the processing proceeds to step S322. In step S322, the system control unit 50 performs imaging with the mechanical shutter without waiting for the elapse of the time set in the self-timer, as described above. In step S328, the system control unit 50 counts down the time set in the self-timer (one of the 2-second self-timer, the 10-second self-timer, and the self-timer set with the arbitrary number of seconds) to wait for the elapse of the time set in the self-timer. During this time period, the system control unit 50 performs countdown notification through self-timer sound and a light emitting portion on the front face of the camera 100. When the time set in the self-timer has elapsed, the processing proceeds to step S322. In step S322, the system control unit 50 performs imaging processing with the mechanical shutter, as described above.

In step S329, the system control unit 50 determines whether another operation is performed. When another operation is performed (YES in step S329), the processing proceeds to step S330. In step S330, the system control unit 50 performs processing according to the operation. On the other hand, when another operation is not performed (NO in step S329), the processing proceeds to step S331. Another operation include an operation for setting imaging conditions such as exposure correction, shutter speed, diaphragm value, International Organization for Standardization (ISO) sensitivity, image size (resolution), compression rate, and AF system, and an operation for switching information displays.

In step S331, the system control unit 50 determines whether an end event for ending the LV imaging mode is received. When the end event is received (YES in step S331), the system control unit 50 ends the LV imaging mode processing. On the other hand, when the end event is not received (NO in step S331), the processing returns to step S301. In step S301, the system control unit 50 repeats the above-described processing. End events include turning power OFF, ending the live view mode (changing to the optical finder imaging mode), and changing to the playback mode.

FIG. 4 is a flowchart illustrating in detail the above-described 2-area enlargement processing in step S314. This processing is implemented when a program recorded in the nonvolatile memory 56 is loaded into the system memory 52 and then the system control unit 50 executes the program.

Figure 6A:
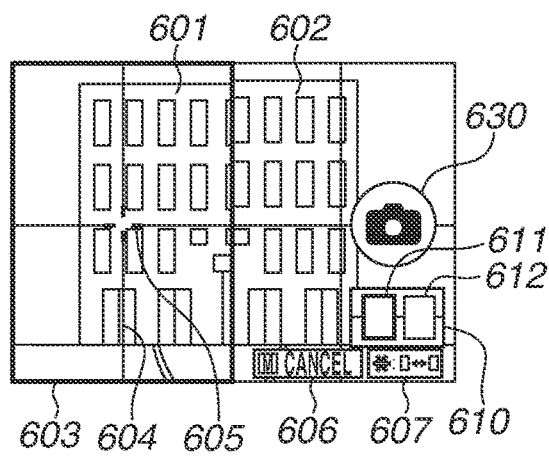
FIGS. 6A to 6H illustrate display examples in the 2-area enlargement processing.

In step S401, the system control unit 50 performs 2-area enlargement display on the display unit 28. An example of a 2-area enlargement display screen is illustrated in FIG. 6A. In the 2-area enlargement display, the system control unit 50 displays side by side the live view images of two areas separated from each other in the lateral direction (horizontal direction) or in the up and down direction (vertical direction). FIG. 6A illustrates an example of the live view images of two areas separated from each other in the horizontal direction displayed side by side on one screen. A left side area 601 is a display area for displaying the live view image currently being captured in a part of the left side area of the imaging unit 22. A right side area 602 is a display area for displaying the live view image currently being captured in a part of the right side area of the imaging unit 22. The live view images displayed in the left side area 601 and the right side area 602 have the same height in the imaging unit 22. An active frame 603 is a selection frame indicating the current operation target area (active area) out of the left side area 601 and the right side area 602. Referring to FIG. 6A, the active frame 603 is displayed on the left side area 601, indicating that the left side area 601 is the current target of right and left movements and AF. Auxiliary lines 604 are displayed at the horizontal and vertical centers of the left side area 601. The intersection of the auxiliary lines 604 is the center of the left side area 601. Likewise, auxiliary lines are displayed at the horizontal and vertical centers of the right side area 602. A center marker 605, a marker displayed on the active frame side, indicates the center of the left side area 601 as an active frame. The auxiliary lines 604 and the center marker 605 are not displayed at the center of the active frame to allow the user to confirm the subject positioned at the center. A guide 606 is a guidance display indicating an operation member (operation method) for canceling the 2-area enlargement display. A guide 607 is a guidance display indicating an operation member (operation method) for switching the active frame. An enlarged position guide 610 indicates the portions currently enlarged as the left side area 601 and the right side area 602 in the entire imaging range (the entire live view image captured by the imaging unit 22 or the entire imaging range reflected in a still image captured according to an imaging instruction). In other words, the enlarged position guide 610 indicates the positions and sizes of the two imaging areas respectively corresponding to the left side area 601 and the right side area 602 relative to the entire imaging range. A left side indicator 611 indicates the range of the live view image displayed in the left side area 601 relative to the entire imaging range. The right side indicator 612 indicates the range of the live view image displayed in the right side area 602 relative to the entire imaging range. To indicate that the active frame 603 is displayed in the left side area 601, the left side indicator 611 is displayed with a different color or thickness from the right side indicator 612. The guides 606 and 607 and the enlarged position guide 610 are superimposed on the live view image of the area without the active frame 603 (non-active frame) so that these guides do not disturb the visual recognition of the live view image of the area with the active frame 603.

A shutter icon 630 is also displayed. The shutter icon 630 is a display item (operation icon) for receiving a touch operation for giving an imaging instruction. Imaging is performed when the user touches this icon. The shutter icon 630 is displayed close to the extension line of the optical axis of subject light incident to the imaging unit 22. This is to prevent the orientation of the digital camera 100 from being deviated in the direction around the optical axis by force applied to the digital camera 100 when the user touches the shutter icon 630. This arrangement enables reducing the possibility that the horizontal orientation adjusted according to the subject in 2-area enlargement is deviated by the force applied when touching the shutter icon 630. The shutter icon 630 is displayed in the left side area 601 or the right side area 602 which is closer to the extension line of the optical axis. Further, the shutter icon 630 is displayed at a position closer to the extension line of the optical axis than any other touch-operable touch icons simultaneously displayed. For example, the shutter icon 630 is displayed at a position closer to the extension line of the optical axis than the guides 606 and 607 as touch-operable touch icons. The guides 606 and 607 and the enlarged position guide 610 are displayed at different positions (in the non-active frame) depending on the position of the active frame 603. On the other hand, the shutter icon 630 is displayed at the same position (on the same, specific direction side, i.e., in the right-hand side area) regardless of the position of the active frame 603. Further, the shutter icon 630 is displayed on the side closer to the grip portion 90 on the display unit 28. More specifically, the shutter icon 630 is displayed in the right side area 602 closer to the grip portion 90 out of the left side area 601 and the right side area 602. In the right side area 602, the shutter icon 630 is displayed on the right-hand side which is close to the grip portion 90, i.e., in the area on the right-hand side of the auxiliary line 604 indicating the horizontal center of the right side area 602. This arrangement aims for making it easy to touch icons with the finger (thumb) of the hand holding the grip portion 90 when the user holds the digital camera 100 by holding the grip portion 90.

The 2-area enlargement display is used to strictly adjust the orientation of the camera 100 before imaging. Therefore, it is not desirable that the orientation of the digital camera 100 is deviated by an imaging instruction operation. However, when issuing an imaging instruction by pressing the shutter button 61, the horizontally adjusted orientation is likely to be deviated. This is because the shutter button 61 is a push-in button which is pushed in the optical axis rotational direction (the direction in which torque in the optical axis rotational direction is applied). On the other hand, a touch operation on the shutter icon 630 applies smaller force to the digital camera 100 than a push-in button operation. The direction in which force is applied during the touch operation is parallel to the optical axis, and therefore torque around the optical axis hardly occurs. Therefore, issuing an imaging instruction through a touch operation on the shutter icon 630 is less likely to deviate the orientation of the digital camera 100 than issuing an imaging instruction by pressing the shutter button 61. Therefore, as illustrated in FIG. 6A, the shutter icon 630 is superimposed on the LV image in the 2-area enlargement display to prompt the user to issue an imaging instruction with a touch operation. When the 2-area enlargement display is not performed, the shutter icon 630 is not displayed as illustrated in FIG. 5A for the following two reasons. For one reason, displaying the shutter icon 630 disturbs the visual confirmation of the LV image. For another reason, when the above-described touch shutter is enabled ("ON"), the user can issue an imaging instruction through a touch operation without displaying the shutter icon 630.

Figure 6C:
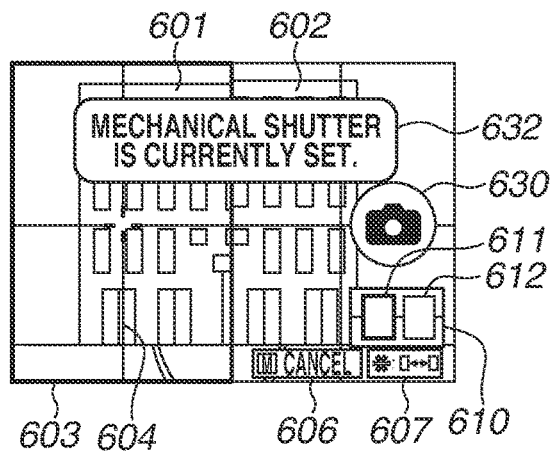
Figure 6B:
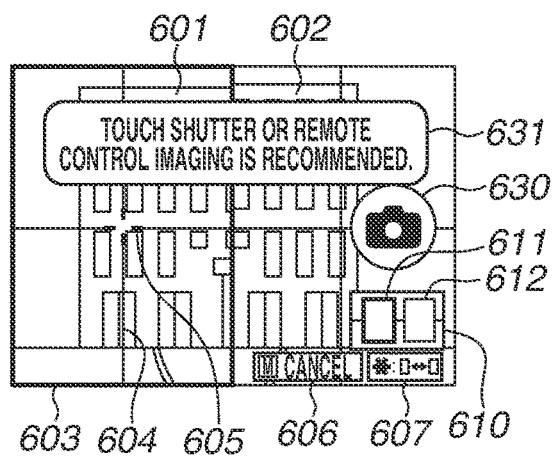

In step S402, referring to setting information recorded in the nonvolatile memory 56, the system control unit 50 determines whether the touch shutter setting is "ON". When the touch shutter setting is "OFF" (NO in step S402), the processing proceeds to step S403. On the other hand, when the touch shutter setting is "ON" (YES in step S402), the processing proceeds to step S404. In step S403, as illustrated in FIG. 6B, the system control unit 50 displays a guidance 631 for recommending the touch shutter or remote control imaging. The guidance 631 may recommend not only the touch shutter but also imaging with a touch operation. Such guidance display makes it possible to reduce the possibility that the user issues an imaging instruction by pressing the shutter button 61 and the orientation of the digital camera 100 is deviated by the depression operation. The guidance 631 is displayed for a predetermined period (for example, 6 seconds) since the 2-area enlargement display is started, and then automatically disappears when the predetermined period has elapsed. This is not to disturb the visual confirmation of the LV image. Although, in the above descriptions, the guidance 631 is displayed when the touch shutter setting is "OFF", the guidance 631 may be displayed regardless of the touch shutter setting. In other words, the guidance 631 may also be displayed when the touch shutter setting is "ON". A display item for setting the touch shutter to "ON" may also be displayed together with the display of the guidance 631. When an operation is performed on this display item, the user may be able to change the touch shutter setting to "ON" without selecting the menu screen.

In step S404, referring to setting information recorded in the nonvolatile memory 56, the system control unit 50 determines whether the 2-area enlargement time shutter setting is the mechanical shutter. When the 2-area enlargement time shutter setting is the mechanical shutter (YES in step S404), the processing proceeds to step S405. On the other hand, when the 2-area enlargement time shutter setting is not the mechanical shutter but the electronic shutter (NO in step S404), the processing proceeds to step S406. In step S405, as illustrated in FIG. 6C, the system control unit 50 displays an attention guidance 632 (warning) notifying that the mechanical shutter is set as the 2-area enlargement time shutter setting. Instead of an attention guidance notifying that the mechanical shutter is set as the 2-area enlargement time shutter setting, a message for recommending for setting the electronic shutter (a message for prompting to set the electronic shutter as the 2-area enlargement time shutter setting) may be displayed. A display item for setting "Electronic Shutter" as the 2-area enlargement time shutter setting may also be displayed together with the display of the guidance 632. When an operation for this display item is performed, the 2-area enlargement time shutter setting may be changed to "Electronic Shutter" without switching to the menu screen. The guidance 632 is displayed for a predetermined period (for example, 6 seconds) since the 2-area enlargement display is started, and then automatically disappears when the predetermined period has elapsed. This is not to disturb the visual confirmation of the LV image. When the touch shutter setting is "OFF" (NO in step S402) and the 2-area enlargement time shutter setting is "Mechanical Shutter" (YES in step S404), the system control unit 50 displays the guidance 631 and the guidance 632 at such positions that the contents thereof do not overlap with each other.

In step S406, the system control unit 50 determines whether either the enlargement button 77 or the reduction button 78 is pressed (enlargement/reduction instruction is issued). When either the enlargement button 77 or the reduction button 78 is pressed (YES in step S406), the processing proceeds to step S407. On the other hand, when neither the enlargement button 77 nor the reduction button 78 is pressed (NO in step S406), the processing proceeds to step S408.

Figure 6D:
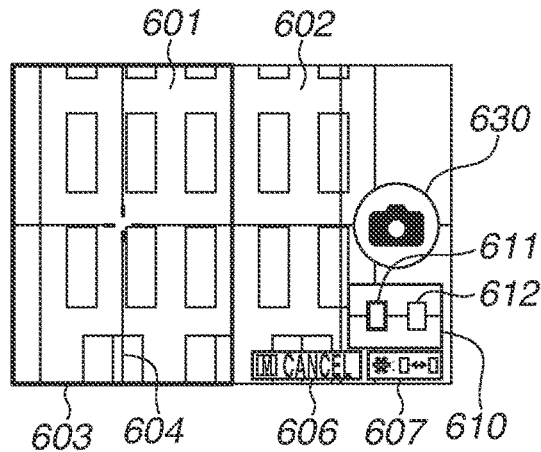

In step S407, the system control unit 50 changes the magnifications of the LV images displayed with 2-area enlargement by an operation. When the enlargement button 77 is pressed, the system control unit 50 increases the respective magnifications of the LV images displayed in the left side area 601 and the right side area 602 and makes the magnifications identical (enlarges the LV images displayed in the left side area 601 and the right side area 602 in an associative way). When the reduction button 78 is pressed, the system control unit 50 decreases the respective magnifications of the LV images displayed in the left side area 601 and the right side area 602 and makes the magnifications identical. The system control unit 50 records the changed magnifications in the system memory 52. Even after the 2-area enlargement display is once canceled, when the 2-area enlargement display is performed again without turning power OFF, the system control unit 50 displays the two LV images with the same magnifications. FIG. 6D illustrates an example screen when the LV images are enlarged by pressing the enlargement button 77 in the state illustrated in FIG. 6A. The live view images displayed in the left side area 601 and the right side area 602 illustrated in FIG. 6D are larger than the respective live view images illustrated in FIG. 6A. The display ranges relative to the entire imaging range decreases according to the degree of enlargement. Therefore, the left side indicator 611 and the right side indicator 612 displayed in the enlarged position guide 610 illustrated in FIG. 6D are smaller than respective indicators illustrated in FIG. 6A.

In step S408, the system control unit 50 determines whether the active frame change button 70d is pressed. When the active frame change button 70d is pressed (YES in step S408), the processing proceeds to step S409. On the other hand, when the active frame change button 70d is not pressed (NO in step S408), the processing proceeds to step S410.

Figure 6E:
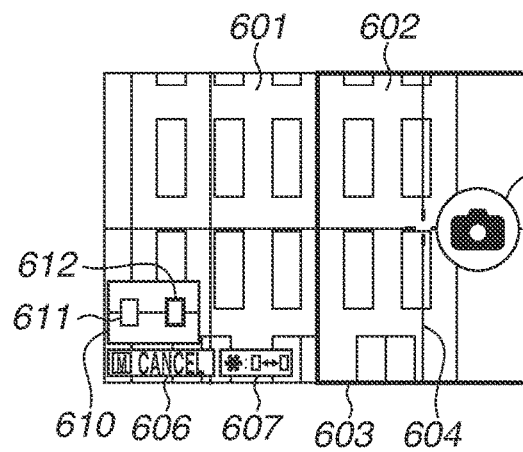

In step S409, the system control unit 50 moves the active frame 603 from the area where the active frame 603 has been positioned before the operation to the other area. FIG. 6E illustrates an example screen when the active frame change button 70d is pressed in the state illustrated in FIG. 6D and the active frame 603 is moved. The active frame 603 positioned on the left side area 601 as illustrated in FIG. 6D has moved to the right side area 602 as illustrated in FIG. 6E. In addition, the guides 606 and 607 and the enlarged position guide 610 have been moved to a position in the left side area 601 as the non-active frame in a superimposed manner.

In step S410, the system control unit 50 determines whether the right/left key of the cross key 74 is operated.

When the right/left key is operated (YES in step S410), the processing proceeds to step S411. On the other hand, when the right/left key is not operated (NO in step S410), the processing proceeds to step S412.

Figure 6G:
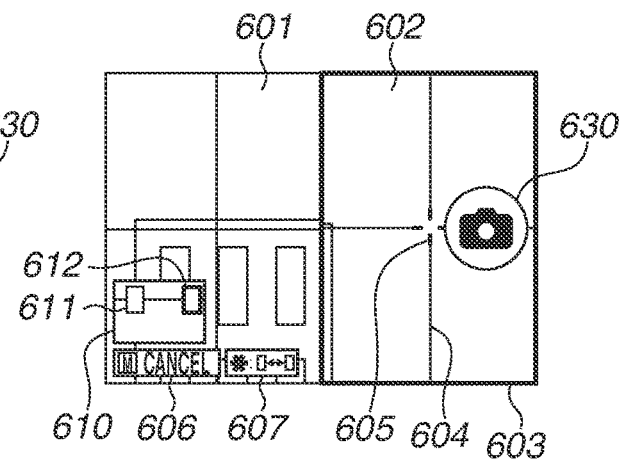
Figure 6F:
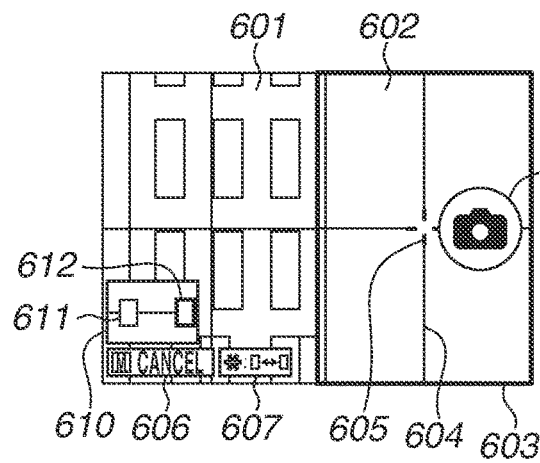

In step S411, in response to operation of the right/left key, the system control unit 50 horizontally moves the display range of the area displayed with the active frame 603. More specifically, when the left key is pressed, the system control unit 50 moves the display range of the area displayed with the active frame 603 towards the left. When the right key is pressed, the system control unit 50 moves the display range of the area displayed with the active frame 603 towards the right. FIG. 6F illustrates an example screen when the right key is pressed several times in the state illustrated in FIG. 6E. Referring to FIG. 6F, the enlargement area displayed with the active frame 603 in the right side area 602 is moved further to the right in the imaging range than in the state illustrated in FIG. 6E (i.e., the image itself scrolls to the left). At this timing, the display range of the left side area 601 as the non-active frame remains unchanged (when the left side area 601 and the right side area 602 do not adjoin each other, the respective horizontal movements are performed not in an associative way). Referring to the enlarged position guide 610 illustrated in FIG. 6F, the right side indicator 612 is moved further to the right than in the state illustrated in FIG. 6E to indicate that the display range of the right side area 602 has further moved towards the right. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges. In a case where the right end of the display range of the left side area 601 adjoins the left end of the display range of the right side area 602, even if the active frame 603 is on the left side area 601, the system control unit 50 moves both of the display ranges of the left side area 601 and the right side area 602 to the right in an associative way in response to an instruction for further movement to the right. However, when the right side area 602 has reached the right end of the entire imaging range, the display ranges cannot be moved any further to the right, so that the system control unit 50 does not move the display ranges even if an instruction for further movement to the right is issued. On the contrary, in a case where the left end of the display range of the right side area 602 adjoins the right end of the display range of the left side area 601, even if the active frame 603 is on the right side area 602, the system control unit 50 moves both of the display ranges of the left side area 601 and the right side area 602 to the left in response to an instruction for further movement to the left. However, when the left side area 601 has reached the left end of the entire imaging range, the display ranges cannot be moved any further to the left, so that the system control unit 50 does not move the display ranges even if an instruction for further movement to the left is issued.

In step S412, the system control unit 50 determines whether the top/bottom key of the cross key 74 is operated. When the top/bottom key is operated (YES in step S412), the processing proceeds to step S413. On the other hand, when the top/bottom key is not operated (NO in step S412), the processing proceeds to step S414.

In step S413, in response to the operation of the top/bottom key, the system control unit 50 vertically moves the display ranges of the left side area 601 and the right side area 602 in an associative way. More specifically, when the upper key is pressed, the system control unit 50 moves up the display ranges of the left side area 601 and the right side area 602 in an associative way. When the lower key is pressed, the system control unit 50 moves down the display ranges of the left side area 601 and the right side area 602 in an associative way. FIG. 6G illustrates an example screen when the upper key is pressed several times in the state illustrated in FIG. 6F. Referring to FIG. 6G, the display ranges of the left side area 601 and the right side area 602 are moved further upward in the imaging range than in the state illustrated FIG. 6F (i.e., the image itself scrolls down). Referring to the enlarged position guide 610 illustrated in FIG. 6G, the left side indicator 611 and the right side indicator 612 are moved further upward than in the state illustrated in FIG. 6F to indicate that the display ranges of the left side area 601 and the right side area 602 have moved further upward. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges.

Figure 6H:
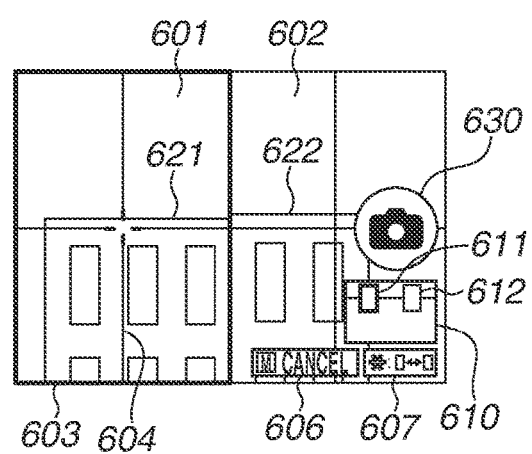

After repeating the above-described operations to set display ranges for the 2-area enlargement display at two separate positions based on the horizon, a horizontal outline of a building, etc., the user can capture a subject image with the line of the subject horizontally reflected by imaging the subject after adjusting the orientation of the camera 100 to align the lines of the subject in the left side area 601 and the right side area 602. FIG. 6H illustrates an example screen at the time of the 2-area enlargement display, in which the left side area 601 is set to a subject portion including a horizontal line 621 and the right side area 602 is set to a subject portion including a horizontal line 622 at a position separate from that of the horizon 621. Although the horizontal lines 621 and 622 are actually a straight line, in the example illustrated in FIG. 6H, the horizon 621 in the left side area 601 and the horizon 622 in the right side area 602 cannot be recognized as one straight line but are slightly mismatched. By monitoring such a display, the user can recognize that the digital camera 100 is not horizontally held. The user can capture an image in which the horizontal line is horizontally reflected by imaging a subject after adjusting the orientation of the digital camera 100 to an orientation with which the horizons 621 and 622 can be visually recognized as one straight line.

In step S414, the system control unit 50 determines whether a touch shutter operation is performed. The processing in step S414 is performed only when the above-described touch shutter setting is "ON" and is not performed when the touch shutter setting is "OFF". When the system control unit 50 determines that the touch shutter operation is performed (YES in step S414), the processing proceeds to step S417. On the other hand, when the operation is not performed (NO in step S414), the processing proceeds to step S415. The touch shutter operation refers to a touch-down on an effective area when the LV image 500 is displayed on the display unit 28. The effective area refers to an area where display elements other than the LV image 500, such as the guides 606 and 607, the enlarged position guide 610, and the shutter icon 630, are not superimposed. Although, in the present exemplary embodiment, the system control unit 50 considers a touch-down as a touch shutter operation, the system control unit 50 may determine that a touch shutter operation is performed when a touch-up is performed on the effective area.

In step S415, the system control unit 50 determines whether a touch-down is performed on the shutter icon 630.

When a touch-down is performed on the shutter icon 630 (YES in step S415), the processing proceeds to step S417. On the other hand, when a touch-down is not performed (NO in step S415), the processing proceeds to step S416. Although, in the present exemplary embodiment, a touch-down on the shutter icon 630 is processed as an imaging instruction operation, a touch-up from the shutter icon 630 may be processed as an imaging instruction operation. In this case, in step S415, the system control unit 50 determines whether a touch-up is performed on the shutter icon 630. When a touch-up is performed on the shutter icon 630 (YES in step S415), the processing proceeds to step S417.

In step S416, the system control unit 50 determines whether the Q button 70c is pressed. When the Q button 70c is pressed (YES in step S416), the processing proceeds to step S417. On the other hand, when the Q button 70c is not pressed (NO in step S416), the processing proceeds to step S421. The Q button 70c is a push-in button closest to the extension line of the optical axis of subject light incident to the imaging unit 22 among the other push-in buttons included in the operation unit 70. For example, the Q button 70c is arranged at a position closer to the extension line of the optical axis than the menu button 70e, the AF-ON button 70b, the SET button 75, the LV button 76, the enlargement button 77, the reduction button 78, the playback button 79, and the active frame change button 70d. The Q button 70c is assigned a function of displaying the quick setting menu during the normal imaging standby state (not during the 2-area enlargement display) and is assigned a function of receiving an imaging instruction operation during the 2-area enlargement display. With a push-in button which is close to the optical axis and is pushed in a direction parallel to the optical axis, torque around the optical axis hardly occurs through a push-in operation. Therefore, it is possible to prevent the orientation of the digital camera 100 from being deviated by the depression of a push-in button. By assigning the function of issuing an imaging instruction during the 2-area enlargement display to the Q button 70c in this way, the orientation of the digital camera 100 can be prevented from being deviated by an imaging instruction issued after strictly adjusting the orientation of the camera 100 through the 2-area enlargement display. When the user has thick gloves on, the user cannot perform a touch operation on the shutter icon 630, and the imaging timing will be delayed in imaging using the self-timer. On the contrary, the user can press the Q button 70c even with gloves on. Pressing the Q button 70c produces little delay of the imaging timing and is unlikely to deviate the orientation of the digital camera 100. Buttons to which the function of issuing an imaging instruction during the 2-area enlargement display is assigned are not limited to the Q button 70c. This function may be assigned to other buttons. However, this imaging instruction function cannot be assigned to a button arranged at a position closest to the extension line of the optical axis if the button needs to be assigned a function other than the imaging instruction function during the 2-area enlargement display. For this reason, the button to which the imaging instruction function is assigned during the 2-area enlargement display is not limited to a button arranged at a position closest to the extension line of the optical axis out of all the buttons. More specifically, the imaging instruction function may also be assigned to a button (with no function assigned during the 2-area enlargement display) arranged at a position closer to the extension line of the optical axis than any other buttons.

In step S417, the system control unit 50 performs an imaging preparation operation such as AF and AE without canceling the 2-area enlargement display. As for AF, the system control unit 50 performs AF on the center portion of the active frame 603 (position indicated by the center marker 605).

In step S418, referring to setting information recorded in the nonvolatile memory 56, the system control unit 50 determines whether the 2-area enlargement time shutter setting is the mechanical shutter. When the 2-area enlargement time shutter setting is the mechanical shutter (YES in step S418), the processing proceeds to step S420. On the other hand, when the 2-area enlargement time shutter setting is not the mechanical shutter (i.e., the 2-area enlargement time shutter setting is the electronic shutter) (NO in step S418), the processing proceeds to step S419.

In step S419, the system control unit 50 performs imaging with the electronic shutter. More specifically, the system control unit 50 performs a series of imaging processing including performing exposure without driving the shutter 101, and recording a captured image in the recording medium 200 as an image file. Imaging with the electronic shutter does not accompany the travel of the shutter 101, making it possible to prevent the orientation adjusted in the 2-area enlargement display from being changed.

In step S420, the system control unit 50 performs imaging with the mechanical shutter. More specifically, the system control unit 50 performs a series of imaging processing including performing exposure by driving the shutter 101, and recording a captured image in the recording medium 200 as an image file.

In step S421, the system control unit 50 determines whether the shutter button 61 is half-pressed and SW1 is set to ON. When SW1 is set to ON (YES in step S421), the processing proceeds to step S422. On the other hand, when SW1 is not set to ON (NO in step S421), the processing proceeds to step S428.

In step S422, the system control unit 50 performs an imaging preparation operation such as AF and AE without canceling the 2-area enlargement display. As for AF, the system control unit 50 performs AF on the center portion of the active frame 603 (position indicated by the center marker 605). When the in-focus state is obtained as a result of AF, focus is fixed (AF lock) while the ON state of SW1 is maintained.

In step S423, the system control unit 50 determines whether the shutter button 61 is fully pressed and SW2 is set to ON. When SW2 is set to ON (YES in step S423), the processing proceeds to step S425. On the other hand, when the SW2 is not set to ON (NO in step S423), the processing proceeds to step S424.

In step S424, the system control unit 50 determines whether the ON state of SW1 is maintained. When the ON state of SW1 is maintained (YES in step S424), the processing returns to step S423. On the other hand, when the ON state of SW1 is not maintained (NO in step S424), the system control unit 50 cancels the auto focus lock state, and the processing returns to step S406.

In step S425, referring to setting information recorded in the nonvolatile memory 56, the system control unit 50 determines whether the self-timer setting is ON in the drive mode settings. This determination is similar to the above-described determination in step S327. When the self-timer setting is ON (YES in step S425), the processing proceeds to step S426. On the other hand, when the self-time setting is not ON (NO in step S425), the processing proceeds to step S427.

In step S426, similar to step S328, the system control unit 50 counts down the time set in the self-timer (any one of 2 seconds, 10 seconds self-timer, the arbitrarily set number of seconds) to wait for the elapse of the time of the self-timer. When the time of the self-timer has elapsed, the processing proceeds to step S418.

In step S427, the system control unit 50 waits for a predetermined time period, for example, 2 seconds. In this way, according to the present exemplary embodiment, when an imaging instruction is issued by pressing the shutter button 61 during the 2-area enlargement display, the system control unit 50 waits for the predetermined time period after the imaging instruction is issued operation and then perform imaging even if the self-timer setting is OFF. This is to wait until a camera shake possibly caused by the depression of the shutter button 61 or other factors stops. This wait process enables preventing imaging from being performed in a state where the orientation of the digital camera 100 once strictly adjusted through the 2-area enlargement display is temporarily deviated by the force of pressing the shutter button 61. Even while the live view is being displayed, the system control unit 50 may once drive the quick return mirror 12 before imaging depending on settings. The above-described wait process allows the system control unit 50 to wait until a vibration by the drive of the mirror stops.

In step S428, the system control unit 50 determines whether the 2-area enlargement end button is pressed. According to the present exemplary embodiment, the 2-area enlargement end button refers to the menu button 70e. When the menu button 70e is pressed (YES in step S428), the processing proceeds to step S429. On the other hand, when the menu button 70e is not pressed (NO in step S428), the processing returns to step S406, and the system control unit 50 repeats the above-described processing.

In step S429, the system control unit 50 cancels (ends) the 2-area enlargement display and restores the entire live view image, and the processing proceeds to step S301 illustrated in FIG. 3. In step S301, the system control unit 50 displays the entire live view image.

The above-described 2-area enlargement processing has an effect of preventing imaging from being performed in a state where the orientation of the digital camera 100 once strictly adjusted through the 2-area enlargement display is deviated. Although some pieces of processing for providing this effect have specifically been described above, not all of them need to be performed. A part of these pieces of processing may be performed. For example, the processing related to the 2-area enlargement time shutter setting (steps S304, S305, S404, S405, S418, and S420) may be omitted. In addition, the processing in step S427 may be omitted, in which, at the time of 2-area enlargement, imaging is performed after a predetermined time has elapsed since an imaging instruction is issued regardless of the self-timer setting. The processing in step S415 may also be omitted, in which the shutter icon 630 is displayed during the 2-area enlargement display. When this processing is omitted, the shutter icon 630 may not be displayed even during the 2-area enlargement display. The processing in step S416 may also be omitted, in which the function of receiving an imaging instruction is assigned to the Q button 70c during the 2-area enlargement display. When this processing is omitted, a new button for receiving an imaging instruction does not need to be provided in the 2-area enlargement display.

An electronic leading blade shutter may be provided as a setting value for the 2-area enlargement time shutter which can be set in step S305. The electronic leading blade shutter system, which does not drive the leading blade for starting exposure, replaces the electronic shutter function. The electronic leading blade shutter does not accompany the travel of a mechanical leading blade, making it possible to restrict the occurrence of a vibration by a traveling blade and accordingly restrict a camera shake to a further extent than the mechanical shutter. When the 2-area enlargement time shutter setting is the electronic leading blade shutter, the result of the determination in step S404 is "NO" and the result of the determination in step S418 is "NO". Then, imaging is performed with the electronic leading blade shutter in a step different from steps S419 and S420.

Although, in the above-described exemplary embodiments, the system control unit 50 prevents a camera shake and orientation deviation when the 2-area enlargement display is performed, the system control unit 50 may perform processing for preventing a camera shake and orientation deviation when electronic level display is performed. The digital camera 100 can also display an electronic level on the display unit 28 together with the live view image based on the detection by the orientation detection unit 55. The system control unit 50 can select whether the electronic level is to be displayed (display ON) or not to be displayed (display OFF) in response to a display switching operation by the user. It is assumed that, also when the electronic level is displayed, the user will perform imaging after strictly adjusting the orientation of the camera 100. Therefore, similar to the above-described 2-area enlargement display, the system control unit 50 may perform at least one piece of the following processing.

Similar to the 2-area enlargement time shutter setting, shutter settings when the electronic level is displayed are possible, i.e., the mechanical shutter, the electronic shutter, and the electronic leading blade shutter can be set. When the electronic level is not displayed, the system control unit 50 performs imaging with the mechanical shutter. When the electronic level is displayed, the system control unit 50 performs imaging based on the system corresponding to the shutter setting when the electronic level is displayed.

When the electronic level is being displayed, the system control unit 50 waits for the elapse of a predetermined time period after an imaging instruction is issued regardless of the self-timer setting and then performs imaging.

When the electronic level is being displayed, the system control unit 50 displays a shutter icon for receiving an imaging instruction, similar to the shutter icon 630. When a touch operation is performed on the shutter icon while the electronic level is displayed, the system control unit 50 performs imaging.

When the electronic level is being displayed, the function of receiving an imaging instruction is assigned to an operation button close to the extension line of the optical axis, such as the Q button 70c.

The above-described various control processing to be performed by the system control unit 50 may be performed by one hardware component, and the entire apparatus may be controlled by a plurality of hardware components which share processing.

While the present disclosure has specifically been described based on exemplary embodiments, the present disclosure is not limited thereto but can be modified in diverse ways without departing from the spirit and scope thereof. The above-described exemplary embodiments are to be considered as illustrative and not restrictive of the scope of the present disclosure. These exemplary embodiments can be suitably combined.

Although, in the above-described exemplary embodiments, the present disclosure is applied to the digital camera 100, the present disclosure is not limited thereto. The present disclosure is also applicable to an imaging apparatus capable of performing the 2-area enlargement display. More specifically, the present disclosure is applicable to a personal computer and a personal digital assistant (PDA) having a camera function, a mobile phone terminal with a camera, a portable image viewer with a camera, a music player with a camera, a game machine with a camera, an electronic book reader with a camera, and so on. The present disclosure is also applicable to a tablet terminal with a camera, a smart phone with a camera, a household appliance and onboard apparatus having a camera function and a display. The present disclosure is also applicable to a smart phone, a tablet personal computer (PC), a desktop PC, etc. which receive and display a live view image captured by a digital camera, etc. via wired or wireless communication and remotely controls the digital camera (including a network camera).

According to the present disclosure, it is possible to restrict the possibility that, in imaging after the orientation of a camera is adjusted, imaging is performed with the camera orientation deviated from the adjusted orientation.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors and one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-025384, filed Feb. 14, 2017, which is hereby incorporated by reference herein in its entirety.

What is claimed is:

1. An imaging apparatus comprising:
   an operation member configured to issue an imaging instruction; and
   a processor and memory that causes the imaging apparatus to:
   perform control to perform 2-area enlargement display for displaying live view images captured in two different areas horizontally or vertically separated from each other by an imaging unit, side by side on a display unit; and
   perform control,
   in a live view display in a state where the 2-area enlargement display is not performed, to issue the imaging instruction by depression of the operation member, and not to display a display item to issue a specific imaging instruction through a touch operation, and
   in a case where the 2-area enlargement display is performed, to display the display item as an operation icon to issue the specific imaging instruction the same as the imaging instruction by depression of the operation member.

2. The imaging apparatus according to claim 1, wherein the imaging apparatus performs control to display the display item in an area closer to a grip portion for holding the imaging apparatus out of the two areas displayed side by side in the 2-area enlargement display.

3. The imaging apparatus according to claim 1, wherein the imaging apparatus performs control to display the display item in an area closer to an extension line of an optical axis of subject light incident to the imaging unit out of the two areas displayed side by side in the 2-area enlargement display.

4. The imaging apparatus according to claim 3, wherein the imaging apparatus performs control to display the display item at a position closer to the extension line of the optical axis than any other touch-operable icons simultaneously displayed.

5. The imaging apparatus according to claim 1, wherein the processor and memory further causes the imaging apparatus to select one of the two areas displayed side by side in the 2-area enlargement display, wherein the display control unit performs control,
   to display an icon indicating an operation method for performing selection in an area unselected according to the selection, and
   to display the display item in an area on a same specific direction side regardless of the selection.

6. The imaging apparatus according to claim 5, wherein the imaging apparatus performs control,
   to display auxiliary lines indicating a horizontal center and a vertical center of each of the two areas displayed side by side in the 2-area enlargement display, and
   to display the display item more on the specific direction side than the auxiliary line indicating the horizontal center of the area on the specific direction side.

7. The imaging apparatus according to claim 1, wherein the imaging apparatus further performs control,
   in response to an imaging instruction in a state where the 2-area enlargement display is not performed, to perform imaging with a mechanical shutter system, and
   in response to an imaging instruction in a state where the 2-area enlargement display is performed, to perform imaging with an electronic shutter system.

8. The imaging apparatus according to claim 1, wherein the imaging apparatus further performs control, in a case where a setting for performing self-timer imaging is not made, in response to an imaging instruction in a state where the 2-area enlargement display is not performed, to perform imaging without waiting for elapse of a predetermined time period, and in response to an imaging instruction in a state where the 2-area enlargement display is performed, to perform imaging after waiting for elapse of the predetermined time period.

9. The imaging apparatus according to claim 1, wherein the imaging apparatus further performs control, upon depression of a specific operation member in a state where the 2-area enlargement display is not performed, to execute a specific function, and upon depression of the specific operation member in a state where the 2-area enlargement display is performed, to perform imaging as a function different from the specific function.

10. The imaging apparatus according to claim 1, wherein, when performing the 2-area enlargement display, the imaging apparatus further performs control to prompt an imaging instruction through a touch operation or remote control.

11. An imaging apparatus comprising:

an operation member configured to issue an imaging instruction;

a processor and memory that causes the imaging apparatus to:

perform control to perform 2-area enlargement display for displaying live view images captured in two different areas horizontally or vertically separated from each other by an imaging unit, side by side on a display unit; and perform control, based on whether the 2-area enlargement display is performed or not, in response to an imaging instruction in a state where the 2-area enlargement display is not performed, to perform imaging with a mechanical shutter system, and in response to an imaging instruction in a state where the 2-area enlargement display is performed, to perform imaging with an electronic shutter system.

12. The imaging apparatus according to claim 11, wherein the processor and memory further causes the imaging apparatus to set a shutter system during the 2-area enlargement display in response to a user operation, wherein, when the electronic shutter system is set by the setting unit and the 2-area enlargement display is being performed, the imaging apparatus performs control to perform imaging with the electronic shutter system in response to an imaging instruction.

13. The imaging apparatus according to claim 12, wherein, in a case where the mechanical shutter is set as a shutter system during the 2-area enlargement display, the imaging apparatus performs control, when performing the 2-area enlargement display, to display a warning or perform display for prompting to set the electronic shutter system.

14. An imaging apparatus comprising:

an operation member configured to issue an imaging instruction;

a processor and memory that causes the imaging apparatus to:

perform control to perform 2-area enlargement display for displaying live view images captured in two different areas horizontally or vertically separated from each other by an imaging unit, side by side on a display unit; and perform control, based on whether the 2-area enlargement display is performed or not, in a case where a setting for performing self-timer imaging is not made, in response to an imaging instruction in a state where the 2-area enlargement display is not performed, to perform imaging without waiting for elapse of a predetermined time period, and in response to an imaging instruction in a state where the 2-area enlargement display is performed, to perform imaging after waiting for elapse of the predetermined time period.

15. An imaging apparatus comprising:

a processor and memory that causes the imaging apparatus to:

perform control to perform 2-area enlargement display for displaying live view images captured in two different areas horizontally or vertically separated from each other by an imaging unit, side by side on a display unit; and perform control, based on whether the 2-area enlargement display is performed or not, upon depression of a specific operation member in a state where the 2-area enlargement display is not performed, to perform a specific function, and upon depression of the specific operation member in a state where the 2-area enlargement display is performed, to perform imaging as a function different from the specific function.

16. The imaging apparatus according to claim 15, wherein the specific operation member is a button arranged at a position closer to an extension line of an optical axis than any other buttons assigned no function during 2-area enlargement display.

17. An imaging apparatus comprising:

an operation member configured to issue an imaging instruction;

a processor and memory that causes the imaging apparatus to:

perform control to perform 2-area enlargement display for displaying live view images captured in two different areas horizontally or vertically separated from each other by an imaging unit, side by side on a display unit; and when performing the 2-area enlargement display, perform control based on whether the 2-area enlargement display is performed or not, to prompt an imaging instruction through a touch operation or remote control.

18. An imaging apparatus comprising:

an operation member configured to issue an imaging instruction;

a processor and memory that causes the imaging apparatus to:

detect an orientation of the imaging apparatus;

perform control to display a level for indicating the orientation of the imaging apparatus based on the orientation detected by the orientation detection unit; and perform control, in a live view display in a state where the level is not displayed, to issue an imaging instruction by depression of the operation member, and not to display a display item to issue an imaging instruction through a touch operation, and in a case where the level is displayed, to display the display item as an operation icon to issue an imaging instruction the same as by depression of the operation member.

19. A method for controlling an imaging apparatus with an operation member configured to issue an imaging instruction, the method comprising:

performing display control to perform 2-area enlargement display for displaying live view images captured in two different areas horizontally or vertically separated from each other by an imaging unit, side by side on a display unit; and performing control, in a live view display in a state where the 2-area enlargement display is not performed, to issue an imaging instruction by depression of the operation member, and not to display a display item to give an imaging instruction through a touch operation, and in a case where the 2-area enlargement display is performed, to display the display item, the display item as an operation icon to give an imaging instruction the same as by depression of the operation member.

20. A method for controlling an imaging apparatus with an operation member configured to issue an imaging instruction, the method comprising:

performing display control to perform 2-area enlargement display for displaying live view images captured in two different areas horizontally or vertically separated from each other by an imaging unit, side by side on a display unit; and performing control, based on whether the 2-area enlargement display is performed or not, in response to an imaging instruction in a state where the 2-area enlargement display is not performed, to perform imaging with a mechanical shutter system, and in response to an imaging instruction in a state where the 2-area enlargement display is performed, to perform imaging with an electronic shutter system.

21. A method for controlling an imaging apparatus with an operation member configured to issue an imaging instruction, the method comprising:

performing display control to perform 2-area enlargement display for displaying live view images captured in two different areas horizontally or vertically separated from each other by an imaging unit, side by side on a display unit; and performing control, based on whether the 2-area enlargement display is performed or not, in a case where a setting for performing self-timer imaging is not made, in response to an imaging instruction in a state where the 2-area enlargement display is not performed, to perform imaging without waiting for elapse of a predetermined time period, and in response to an imaging instruction in a state where the 2-area enlargement display is performed, to perform imaging after waiting for elapse of the predetermined time.

22. A method for controlling an imaging apparatus, the method comprising:

performing display control to perform 2-area enlargement display for displaying live view images captured in two different areas horizontally or vertically separated from each other by an imaging unit, side by side on a display unit; and performing control, based on whether the 2-area enlargement display is performed or not, upon depression of a specific operation member in a state where the 2-area enlargement display is not performed, to perform a specific function, and upon depression of the specific operation member in a state where the 2-area enlargement display is performed, to perform imaging as a function different from the specific function.

23. A non-transitory computer-readable recording medium storing a program for causing a computer to execute a method for controlling an imaging apparatus with an operation member configured to issue an imaging instruction, the method comprising:

performing display control to perform 2-area enlargement display for displaying live view images captured in two different areas horizontally or vertically separated from each other by an imaging unit, side by side on a display unit; and performing control, in a live view display in a state where the 2-area enlargement display is not performed, to issue an imaging instruction by depression of the operation member, and not to display a display item for receiving an imaging instruction through a touch operation, and in a case where the 2-area enlargement display is performed, to display the display item as an operation icon to issue an imaging instruction the same as by depression of the operation member.

24. A non-transitory computer-readable recording medium storing a program for causing a computer to execute a method for controlling an imaging apparatus with an operation member configured to issue an imaging instruction, the method comprising:

performing display control to perform 2-area enlargement display for displaying live view images captured in two different areas horizontally or vertically separated from each other by an imaging unit, side by side on a display unit; and performing control, based on whether the 2-area enlargement display is performed or not, in response to an imaging instruction in a state where the 2-area enlargement display is not performed, to perform imaging with a mechanical shutter system, and in response to an imaging instruction in a state where the 2-area enlargement display is performed, to perform imaging with an electronic shutter system.

* * * * *